United States Patent
Knorr et al.

(10) Patent No.: US 11,741,624 B2
(45) Date of Patent: *Aug. 29, 2023

(54) METHOD AND SYSTEM FOR DETERMINING SPATIAL COORDINATES OF A 3D RECONSTRUCTION OF AT LEAST PART OF A REAL OBJECT AT ABSOLUTE SPATIAL SCALE

(71) Applicant: Apple Inc., Cupertino, CA (US)

(72) Inventors: Sebastian Knorr, Mountain View, CA (US); Daniel Kurz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/076,507

(22) Filed: Oct. 21, 2020

(65) Prior Publication Data

US 2021/0110560 A1 Apr. 15, 2021

Related U.S. Application Data

(63) Continuation of application No. 16/546,833, filed on Aug. 21, 2019, now Pat. No. 10,846,871, which is a (Continued)

(51) Int. Cl.
*G06T 7/579* (2017.01)
*G06T 7/246* (2017.01)
*G06T 7/277* (2017.01)

(52) U.S. Cl.
CPC .............. *G06T 7/579* (2017.01); *G06T 7/251* (2017.01); *G06T 7/277* (2017.01);
(Continued)

(58) Field of Classification Search
None
See application file for complete search history.

(56) References Cited

U.S. PATENT DOCUMENTS

| 8,350,922 B2 | 1/2013 | D'Angelo |
| 9,554,123 B2 * | 1/2017 | Rhoads ................... G06T 17/00 |

(Continued)

FOREIGN PATENT DOCUMENTS

| CN | 101833788 A | 9/2010 |
| CN | 101908231 A | 12/2010 |

(Continued)

OTHER PUBLICATIONS

A. Flores, E. Christiansen, D. Kriegman, and S. Belongie, "Camera distance from face images," In Proc. ISVC, 2013.
(Continued)

*Primary Examiner* — Vikkram Bali
(74) *Attorney, Agent, or Firm* — Blank Rome LLP

(57) ABSTRACT

Determining spatial coordinates of a 3D reconstruction includes obtaining, from a first camera system, a first image comprising a first real object, obtaining, from a second camera system, a second image comprising a second real object associated with known geometric properties, wherein the first camera system and the second camera system have a known spatial relationship, and determining a scale of the face based on the second image and the known geometric properties of the at least part of the second real object. Determining the spatial coordinates of the 3D reconstruction also includes determining a pose of the first and second camera systems, and determining the spatial coordinates based on the pose of the first camera system and the scale of the at least part of the second real object.

20 Claims, 12 Drawing Sheets

Related U.S. Application Data continuation of application No. 15/525,310, filed as application No. PCT/EP2014/075299 on Nov. 21, 2014, now Pat. No. 10,445,895.

(52) U.S. Cl.
CPC ............... *G06T 2207/10016* (2013.01); *G06T 2207/10028* (2013.01); *G06T 2207/10048* (2013.01); *G06T 2207/20076* (2013.01); *G06T 2207/20092* (2013.01); *G06T 2207/30201* (2013.01); *G06T 2207/30244* (2013.01)

(56) References Cited

U.S. PATENT DOCUMENTS

| | | | | |
|---|---|---|---|---|
| 9,615,012 | B2* | 4/2017 | Geiss | H04N 13/239 |
| 10,846,871 | B2* | 11/2020 | Knorr | G06T 7/277 |
| 2008/0073539 | A1 | 3/2008 | Hans | |
| 2014/0043436 | A1 | 2/2014 | Bell | |

FOREIGN PATENT DOCUMENTS

| | | |
|---|---|---|
| CN | 103247075 A | 8/2013 |
| CN | 103345114 A | 10/2013 |
| CN | 103366356 A | 10/2013 |

OTHER PUBLICATIONS

B. Clipp, J.-H. Kim, J.-M. Frahm, M. Pollefeys, and R. Hartley, "Robust 6dof motion estimation for non-overlapping, multi-camera systems," In Proc. WACV, 2008.

Davison et al., "MonoSLAM: Real-time single camera SLAM." Pattern Analysis and Machine Intelligence, IEEE Transactions on 29.6 (2007): 1052-1067.

E. Murphy-Chutorian and M. M. Trivedi, "Head pose estimation in computer vision: A survey," TPAMI, 31(4):607-626, 2009.

Klein, et al. "Parallel Tracking and Mapping for Small AR Workspaces," 2007 IEEE/ACM International Symposium on Mixed and Augmented Reality, pp. 225-234, 2007.

Lemaire, Thomas, et al., "Vision-based SLAM: Stereo and monocular approaches." International Journal of Computer Vision 74.3 (2007): 343-364.

Lieberknecht, Sebastian, et al., "RGB-D camera-based parallel tracking and meshing." Mixed and Augmented Reality (ISMAR), 2011 10th IEEE International Symposium on. IEEE, 2011.

Metaio GmbH. Metaio SDK, http://www.metaio.com/sdk, Mar. 2015.

N. A. Dodgson, "Variation and extrema of human interpupillary distance," In Proc. SPIE 5291, 2004.

Nutzi, Gabriel, et al. "Fusion of IMU and vision for absolute scale estimation in monocular SLAM." Journal of intelligent & robotic systems 61.1-4 (2011): 287-299.

P. Tanskanen, K. Kolev, L. Meier, F. Camposeco, O. Saurer, and M. Pollefeys, "Live metric 3d reconstruction on mobile phones," In Proc. ICCV, 2013.

S. Umeyama, "Least-squares estimation of transformation parameters between two point patterns," TPAMI, 13 (4):376-380, 1991.

T. Lee and T. Hollerer, "Multithreaded hybrid feature tracking for markerless augmented reality," TVCG, 15(3):355-368, 2009.

Taragay Oskiper et al., "Visual Odometry System Using Multiple Stereo Cameras and Inertial Measurement Unit," CVPR '07, IEEE Conference on Computer Vision and Pattern Recognition, Jun. 18-23, 2007, Minneapolis, Mn, USA, IEEE, Piscataway, NJ, USA, Jun. 1, 2007 (Jun. 1, 2007), pp. 1-8, XP031114344, DOI: 10.1109/CVPR.2007.383170, ISBN: 978-1-4244-1179-5.

X. Cao, Y. Wei, F. Wen, and J. Sun, "Face alignment by explicit shape regression," IJCV, 107(2):177-190, 2014.

X. P. Burgos-Artizzu, M. R. Ronchi, and P. Persona, "Distance estimation of an unknown person from a portrait," In Proc. ECCV, 2014.

Z. Zhang, "A flexible new technique for camera calibration," IEEE Transactions on Pattern Analysis and Machine Intelligence, 22(11):1330-1334, 2000.

\* cited by examiner

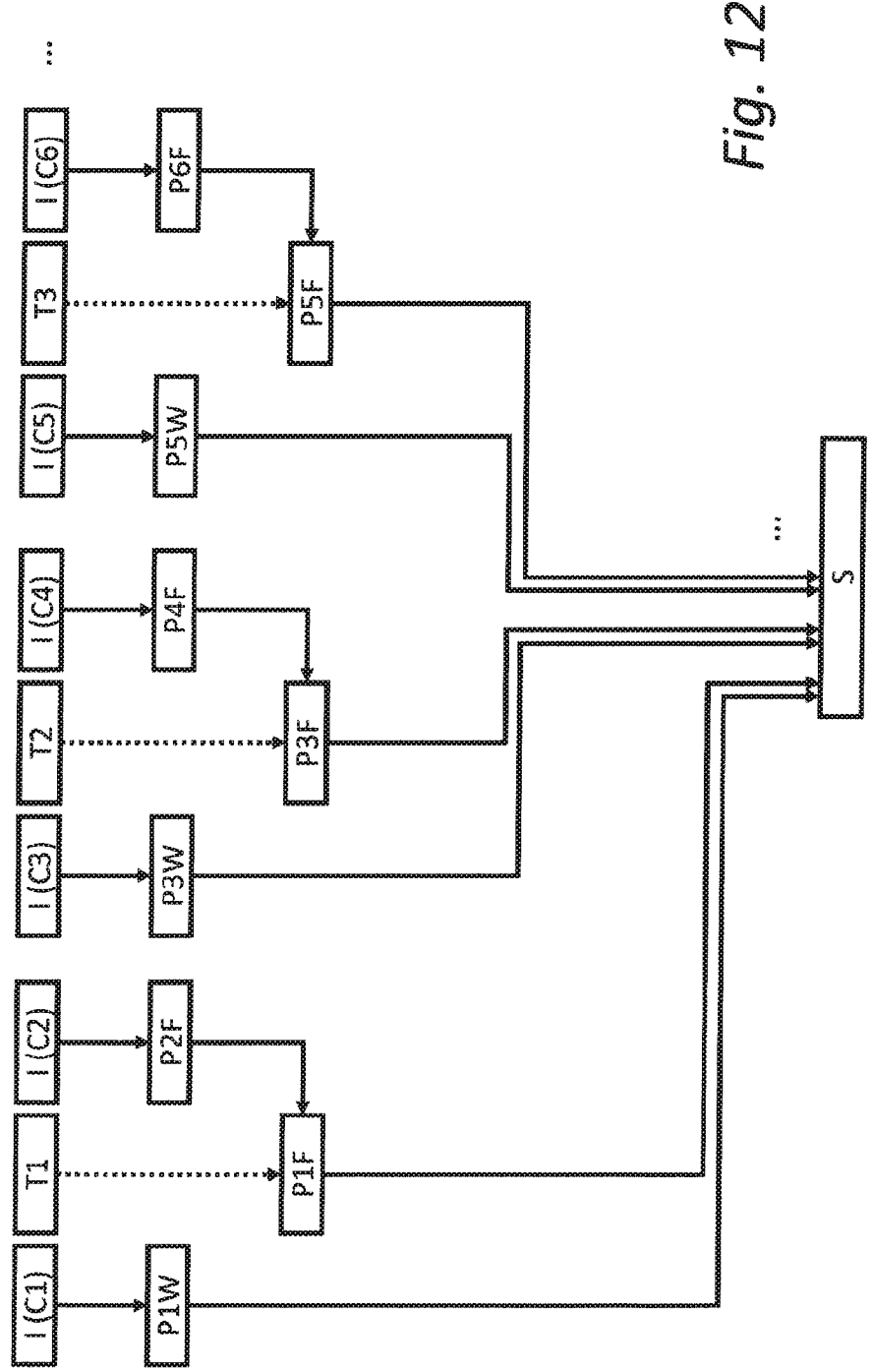

METHOD AND SYSTEM FOR DETERMINING SPATIAL COORDINATES OF A 3D RECONSTRUCTION OF AT LEAST PART OF A REAL OBJECT AT ABSOLUTE SPATIAL SCALE

BACKGROUND

The present disclosure is related to a method and system for determining spatial coordinates of a 3D reconstruction of at least part of a first real object at absolute spatial scale.

Computer vision methods that involve analysis of images are often used, for example, in navigation, object recognition, 3D reconstruction, and Augmented Reality applications, to name a few. The images may be captured by a single camera or different cameras. Detection of image features (such as corners and edges) and image feature extraction is a common step in various computer vision methods or algorithms, such as image based recognition, image based tracking, image based reconstruction, image based classification, and image warping. For example, vision based Simultaneous Localization and Mapping (SLAM) is a well-known computer vision method using one or more cameras for reconstructing a real environment and tracking the one or more cameras. Given at least two images captured by one or more cameras, a typical SLAM method comprises feature detection, description, matching, triangulation and (global) map refinement.

It is a commonly known problem that approaches to determine the structure of a real object based on a set of images captured by a monocular capture apparatus result in a reconstruction of the spatial (or geometrical) structure which is up-to-scale. This means the reconstruction uses spatial units for which the scaling factor to absolute spatial units, such as the unit meter, is unknown. In many applications, it is desirable to obtain, e.g. a reconstruction in absolute units, also referred to as "at absolute scale". This often requires knowledge of at least one distance at absolute scale, for example between parts of the real object or between positions of the camera relative to the real object at the time when the respective images for reconstruction were taken.

Thus, a common problem of various SLAM and SfM systems is that a reconstructed geometrical model of a real environment is up to a scale as an undetermined factor. If the real object is unknown and the poses of the cameras that took the images for reconstruction are also unknown, then it is impossible to determine the absolute spatial scale of the scene. For example, based on two images of a car as shown in FIG. 2a—one taken from the front I(W1), and one from the right I(W2)—it is impossible to tell if it is a real full-size car or if it is a small realistic miniature car. Consequently, it is also impossible to tell if the cameras that took the two images are many meters apart from another (as is the case for a full-size car) or only a few centimeters apart (as is the case for a miniature car). However, if additional information on the absolute spatial scale of either the camera poses (e.g. the two cameras are 2.34 meters apart) or parts of the object (e.g. the car's headlights are 3.45 centimeters apart) is known, the reconstruction can be performed at absolute scale.

In a case where the absolute spatial scale of a scene cannot be determined, the SLAM system may assign a random scale for example by determining initial keyframes from pixel disparity measurements in image space and assuming some generic real-world distance for the baseline between the two corresponding camera poses. Therefore, reconstructed 3D features have coordinates in a coordinate system associated with the geometrical model which has an unknown scale factor relative to absolute coordinates as they are in the real world, e.g. millimeters, centimeters, meters, or inches. Further, camera positions computed based on the recovered geometrical models are also up to the scale, see reference [4].

The undetermined scale factor introduces challenges to determine true camera movements at absolute scale in, for example, vision-based navigation of a robot system or a vehicle, and to correctly overlay virtual visual information to the real environment in an image of a camera in Augmented Reality applications. As an example, a vision-based navigation application may be able to determine the shape of the camera motion (e.g. that the camera is moving on a circular path), but it cannot determine translational parts (e.g. distances or positions) at absolute scale, e.g. if the radius of the circle is 1 meter or 10 meters. As another example, consider an Augmented Reality application that superimposes a virtual piece of furniture spatially registered on a live video feed of the environment. If camera tracking is performed in a coordinate system with a random (i.e. arbitrary) scale, then also the superimposed virtual furniture will have an arbitrary scale. A virtual 2 meters high cupboard could look three times as high as a 1 meter high table or it could look half as high as that table, depending on the arbitrary scale that was chosen during reconstruction. Obviously, this is not desirable. Instead, a virtual 2 meters high cupboard should appear twice as high as a 1 meter high real table next to it. The real and the virtual objects in the camera augmented by superimposition should be consistent in terms of scale. In order to enable this, the (correct) absolute scale of the geometrical model of the real environment is desired to be known.

Also, in a situation in which multiple geometrical models of multiple real objects have been separately created using the same vision-based SLAM system for tracking the multiple real objects simultaneously, like in reference [8], the problem of undetermined scale factors is quite significant. Typically, random scale values are applied to each of the multiple geometrical models. If the SLAM system switches between the geometrical models, the scale may change and, therefore, the user experience in computer vision applications like Augmented Reality is seriously affected.

Various methods have been proposed for determining correct scale factors that could define true sizes of reconstructed geometrical models of real environments as they are in the real world.

For example, Davison et al. in reference [1] propose to introduce calibration objects with known absolute spatial dimensions into the scene for determining absolute scale in SLAM systems. Thereby they need to change the appearance of the scene because they use the same camera to capture the calibration objects and to capture the scene to reconstruct in SLAM. Also the user has to have the calibration objects available.

Lemaire et al. in reference [5] propose to use a stereo camera system (i.e. two cameras with displacement with an overlapping camera frustum) to solve the problem of determining absolute scale in SLAM systems. However, using a stereo camera is only a partial remedy, since the displacement between the two cameras has to be significant in relation to the distance to the environment or object in order to reliably compute depth of the environment. Also the displacement between the two cameras needs to be known at absolute scale, i.e. in units such as millimeters, centimeters, meters, or inches.

Also approaches for estimating absolute scale using multi-camera set-ups with non overlapping camera frustums are disclosed in reference [14]. However, the displacement between the two cameras has to be significant in relation to the distance to the environment or object in order to reliably compute depth of the environment.

Lieberknecht et al. in reference [6] integrate depth information into monocular vision-based SLAM to allow correctly scaled geometrical model reconstruction by employing an RGB-D camera that provides absolute depth information related to image pixels. It is possible to determine absolute scale from known depth information at absolute scale. However, an RGB-D camera device is not commonly available in a hand-held device, e.g. mobile phone, tablet computer, or PDA, compared to a normal monocular RGB camera. Also active stereo-based depth cameras, that are based on projecting infrared light into the scene, do not work reliably if there is significant infrared environment light, as the case for outdoor environment during daylight.

Klein et al. in reference [7] solve the problem of scale estimation by manually defining a baseline (i.e. the distance at absolute scale) between the two positions of a camera while it captured the two images needed for 3D triangulation, which is used to reconstruct the environment.

Sensor fusion with an Inertial Measurement Unit (IMU) could also be used to estimate the absolute scale, as disclosed in reference [9]. One problem with this approach is the inaccuracy of the sensor values resulting in inaccurate scale estimates. Expensive (i.e. calculation intensive) techniques like "Kalman Filtering" or "Bundle Adjustment" are used to address the problem, but usually the accuracy of the IMUs integrated in off-the-shelf devices, such as mobile phones, is not sufficient to estimate absolute scale accurately.

Therefore it would be desirable to provide a method and system for determining spatial coordinates of a 3D reconstruction of at least part of a first real object at absolute spatial scale which are capable of reconstructing real objects at absolute scale or determining a scale factor which maps coordinates of a reconstruction at an arbitrary scale to absolute scale.

SUMMARY

According to a first aspect, there is disclosed a method of determining spatial coordinates of a 3D reconstruction of at least part of a first real object at absolute spatial scale comprising the steps of:
a) receiving image information of a first image including at least part of the first real object captured with a first camera
b) receiving image information of a third image including the at least part of the first real object captured with a third camera,
c) receiving image information of a second image including at least a first part of a second real object captured with a second camera,
d) receiving image information of a fourth image including at least a second part of the second real object captured with a fourth camera, wherein the frustum of the first camera and the frustum of the second camera do not overlap and wherein the frustum of the third camera and the frustum of the fourth camera do not overlap,
e) providing a first spatial transformation between the first camera and the second camera and providing a second spatial transformation between the third camera and the fourth camera,
f) providing a first scale information indicative of an absolute spatial scale of the at least first part of the second real object, and a second scale information indicative of an absolute spatial scale of the at least second part of the second real object,
g) determining at least part of a pose of the second camera and at least part of a pose of the fourth camera according to the second image, the first scale information, the fourth image and the second scale information, wherein the at least part of the pose of the second camera and the at least part of the pose of the fourth camera are defined in a second common coordinate system,
h) determining at least part of a pose of the first camera according to the at least part of the pose of the second camera and the first spatial transformation, and determining at least part of a pose of the third camera according to the at least part of the pose of the fourth camera and the second spatial transformation, wherein the at least part of the pose of the first camera and the at least part of the pose of the third camera are defined in the second common coordinate system,
i) determining spatial coordinates of a 3D reconstruction of the at least part of the first real object at absolute spatial scale according to the first image, the third image and the at least part of the pose of the first camera and the at least part of the pose of the third camera.

According to an embodiment, the at least part of the pose of the second camera, the at least part of the pose of the fourth camera, the at least part of the pose of the first camera, and the at least part of the pose of the third camera each include translational information.

According to an embodiment, the step i) comprises determining the pose of the first camera and the pose of the third camera according to the first image and the third image, wherein the pose of the first camera and the pose of the third camera are defined in a first common coordinate system, determining a first translational information indicative of at least one distance according to translational information of the pose of the first camera and translational information of the pose of the third camera in the first common coordinate system, determining a second translational information indicative of at least one distance according to the at least part of the pose of the first camera and the at least part of the pose of the third camera in the second common coordinate system, determining a scale factor according to the first and the second translational information, determining spatial coordinates of the 3D reconstruction of the at least part of the first real object at arbitrary spatial scale in the first common coordinate system according to the first image, the third image and the pose of the first camera and the pose of the third camera, and transforming the determined spatial coordinates of the 3D reconstruction from the arbitrary spatial scale of the first common coordinate system to the absolute spatial scale of the second common coordinate system according to the scale factor.

According to an embodiment, the step i) further comprises determining the pose of the first camera and the pose of the third camera according to the first image and the third image, wherein the pose of the first camera and the pose of the third camera are defined in a first common coordinate system, providing the at least part of the pose of the first camera and the at least part of the pose of the third camera defined in a second common coordinate system, updating translational information related to the pose of the first camera and translational information related to the pose of the third camera in the first common coordinate system according to the at least part of the pose of the first camera and the at least part of the pose of the third camera in the second common coordinate system, and determining the spatial coordinates of the 3D reconstruction of the at least part of the first real object at absolute spatial scale according to the first image, the third image and the updated pose of the first camera and the updated pose of the third camera.

For example, the at least part of the pose of the second camera includes 3 DoF translational information and 3 DoF rotational information, the at least part of the pose of the fourth camera includes 3 DoF translational information and 3 DoF rotational information, the at least part of the pose of the first camera includes 3 DoF translational information and 3 DoF rotational information, and the at least part of the pose of the third camera includes 3 DoF translational information and 3 DoF rotational information.

According to a second aspect, there is disclosed a method of determining spatial coordinates of a 3D reconstruction of at least part of a first real object at absolute spatial scale comprising the steps of:
   a) receiving image information of a first image including at least part of the first real object captured with a first camera,
   b) receiving image information of a third image including the at least part of the first real object captured with a third camera,
   c) receiving image information of a second image including at least a first part of a second real object captured with a second camera,
   d) receiving image information of a fourth image including at least a second part of the second real object captured with a fourth camera,
   wherein the frustum of the first camera and the frustum of the second camera do not overlap and wherein the frustum of the third camera and the frustum of the fourth camera do not overlap,
   e) providing a first scale information indicative of an absolute spatial scale of the at least first part of the second real object, and a second scale information indicative of an absolute spatial scale of the at least second part of the second real object,
   f) determining at least part of a pose of the second camera and at least part of a pose of the fourth camera according to the second image, the first scale information, the fourth image and the second scale information, wherein the at least part of the pose of the second camera and the at least part of the pose of the fourth camera are defined in a second common coordinate system, wherein the at least part of the pose of the second camera includes translational information and the at least part of the pose of the fourth camera includes translational information,
   g) determining the pose of the first camera and the pose of the third camera according to the first image and the third image, wherein the pose of the first camera and the pose of the third camera are defined in a first common coordinate system,
   i) the method further comprising
      i0) determining a second translational information indicative of at least one distance according to the at least part of the pose of the second camera and the at least part of the pose of the fourth camera,
      i1) determining a first translational information indicative of at least one distance according to a translation of the pose of the first camera and a translation of the pose of the third camera,
      i2) determining a scale factor according to the first and the second translational information,
      i3) determining spatial coordinates of a 3D reconstruction of the at least part of the first real object at arbitrary scale according to the first image, the third image and the pose of the first camera and the pose of the third camera,
      i4) transforming the determined spatial coordinates of the 3D reconstruction from the arbitrary spatial scale to absolute spatial scale according to the scale factor, or
   k) instead of steps i0)-i4), the method further comprising
      k1) updating translational information related to the pose of the first camera and translational information related to the pose of the third camera to be at absolute spatial scale according to the at least part of the pose of the second camera and the at least part of the pose of the fourth camera,
      k2) determining spatial coordinates of a 3D reconstruction of the at least part of the first real object at absolute spatial scale according to the first image, the third image and the updated pose of the first camera and the updated pose of the third camera.

The following embodiments may be implemented equally for the invention according to the first aspect or the second aspect.

According to an embodiment, the second common coordinate system is associated with the second real object, and the step g) (first aspect) or f) (second aspect), respectively, comprises determining the at least part of the pose of the second camera according to the second image and the first scale information, and determining the at least part of the pose of the fourth camera according to the fourth image and the second scale information.

According to an embodiment, the second common coordinate system is associated with a selected camera which is one of the second camera and the fourth camera, wherein another camera of the second camera and the fourth camera is an unselected camera, and the step g) (first aspect) or f) (second aspect), respectively, comprises providing a pose related to the selected camera in the second common coordinate system, and determining a pose related to the unselected camera according to the second image, the first scale information, the fourth image and the second scale information.

According to an embodiment, the first common coordinate system is associated with the first real object or one of the first camera and the third camera.

According to an embodiment, the at least first part of the second real object and the at least second part of the second real object are the same part and the first scale information and the second scale information are the same, or the at least first part of the second real object and the at least second part of the second real object are different parts and the first scale information and the second scale information are different.

According to an embodiment, the first camera and the second camera face in opposite directions, and the third camera and the fourth camera face in opposite directions.

According to an embodiment, the second real object is a human face, and the step g) (first aspect) or f) (second aspect), respectively, is implemented with a face tracking method, wherein the first scale information and/or the second scale information is provided as at least one distance between positions of at least two facial features at absolute scale.

According to an embodiment, the second real object is a human face, and the step g) (first aspect) or f) (second aspect), respectively, is implemented with a face tracking method and wherein the first scale information and/or the second scale information is provided as at least one depth information at absolute scale for the position of at least one part of the second real object in at least one of the second and fourth images.

According to an embodiment, at least one of the second and fourth camera provide depth information at absolute scale and the step g) (first aspect) or f) (second aspect), respectively, is implemented with a visual odometry method at absolute scale and the first scale information and/or the second scale information is provided by the depth information.

According to an embodiment, the first camera and the third camera are the same camera at different points in time, and the second camera and the fourth camera are the same camera at different points in time.

According to an embodiment, the second real object is a human face.

According to an embodiment, the first scale information and/or the second scale information comprises the interpupillary distance.

According to an embodiment, the method further includes providing at least part of intrinsic camera parameters of the second camera and at least part of intrinsic camera parameters of the fourth camera.

Preferably, a user who carries the first to fourth camera is static. For example, the method further includes the step of determining when the user is static.

According to an embodiment, the second and fourth camera each comprise an infrared camera.

According to an embodiment, the determination of the scale factor is based on a set of N pairs of poses, with N>2.

According to an embodiment, the method further uses a human face model with respect to the second real object which is generic.

According to an embodiment, the method further uses a human face model with respect to the second real object which is probability distribution based.

According to an embodiment, the method further uses a human face model with respect to the second real object which is calibrated, particularly adaptive, reconstructed, or manually measured.

According to an embodiment, the method further comprises face recognition or classification to choose a model related to the second object.

According to an embodiment, the method further comprises detecting a user input for starting the method and providing an instruction to the user to perform a certain motion with the second camera, the motion being measured based on images captured with the second camera, and receiving a user interaction which triggers the determination of the spatial coordinates of the 3D reconstruction.

According to an embodiment, the second real object is considered being static in relation to the first real object while capturing the first, second, third, and fourth image.

According to an embodiment, the first, second, third, and fourth image are selected based on a method that determines that the second real object is static in relation to the first real object while capturing the first, second, third, and fourth images.

According to an embodiment, determining a second translational information indicative of at least one distance according to the at least part of the pose of the second camera and the at least part of the pose of the fourth camera considers only the distance between the second real object and the second camera and the distance between the second real object and the fourth camera.

According to an embodiment, the steps a) to i2) of the second aspect are performed repeatedly on a multitude of sets of first images, second images, third images, and fourth images, wherein the images of the different sets may or may not overlap with each other, resulting in a multitude of scale factors in step i2), and the method further comprising determining from the multitude of scale factors a single scale factor, and in step i4) using the single scale factor to transform the spatial coordinates.

According to an embodiment, the steps a) to i1) of the second aspect are performed repeatedly on a multitude of sets of first images, second images, third images, and fourth images, where the images of the different sets may or may not overlap with each other, resulting in a multitude of first translational information in step i1) and second translational information in step i0), wherein step i2) determines a scaling factor according to the multitudes of first translational information in step i1) and second translational information in step i0).

According to an embodiment, the first scale information and/or the second scale information is provided as at least one distance between the position of at least two facial features at absolute scale according to a generic face model, e.g. probability distribution based.

According to an embodiment, the first scale information and/or the second scale information is provided as at least one distance between the position of at least two facial features at absolute scale according to a previous calibration, e.g. by adaptive fitting, reconstruction, manually measuring of at least one distance between the position of at least two facial features at absolute scale of a particular face.

According to an embodiment, the first scale information and/or the second scale information is provided as at least one distance between the position of at least two facial features at absolute scale according to a model selected based on visual face recognition.

According to an embodiment, the first scale information and/or the second scale information is provided as at least one distance between the position of at least two facial features at absolute scale according to a model selected from a database based on visual face classification, to determine properties of the face such as the age, gender, ethnicity, weight, or height from a dataset of generic face models for different classes of faces.

According to an embodiment, the 3D reconstruction of the first real object at absolute scale is used to determine a camera pose at absolute scale. For example, the camera pose at absolute scale is used to superimpose digital information in an augmented reality application.

According to an embodiment, the method is being triggered by a user input. According to another embodiment, the method is being triggered automatically.

According to another aspect, there is disclosed a system for determining spatial coordinates of a 3D reconstruction of at least part of a first real object at absolute spatial scale, comprising a processing system which is configured to perform the steps as set out in any of the aspects and embodiments disclosed above.

According to a preferred embodiment, when having a capturing apparatus that captures a human face and a real object, we thereby use the face to determine a distance at absolute scale, which may be used for the purposes of the present invention. The capturing apparatus can be a single camera or a set of rigidly connected cameras, e.g. such as in a commonly available mobile phones. With such mobile phone having a front facing camera and a back facing camera, the front facing camera may capture the user's face while the back facing camera captures the (first) real object.

Generally, the invention is related to the problem of determining spatial coordinates of a 3D reconstruction of a first real object at absolute scale, which may be addressed by observing the first real object and a second real object with an imaging device from each at least two viewpoints where the spatial coordinates of at least two points of the second real object are known at absolute scale, which enables determining the distance between the at least two viewpoints at absolute spatial scale, and which enables determining absolute spatial scale for the spatial coordinates of the reconstruction of the first real object.

Further, the inventors found that the face of the user can be captured by a user-facing camera while capturing an object or environment with a world-facing camera. It further includes realizing that human faces have a limited variety in absolute scale and therefore provide a good scale constraint for measuring at absolute scale. A generic face model can be used to determine absolute spatial scale if the spatial properties of a particular user's face are unknown. Thereby an introduced error depends on the variation of the spatial properties of human faces that led to the estimate. Even if the assumed spatial properties differ from the actual ones, which results in a somewhat more inaccurate absolute scale estimate, multiple scale estimates using the same properties and the same face will always result in similar absolute scales. Thereby, scale estimated may be inaccurate but precise, i.e. consistent. If a particular face is used that has been calibrated (i.e. measured), then the scale of the face is accurately known at absolute scale.

Further, it has been discovered that no extra known object needs to be added to the scene. By exploiting a user-facing and a world-facing camera of modern handheld devices, a human face which provides information about absolute scale does not need to be part of that part of the scene which is captured and reconstructed by the world-facing camera, but instead can be captured while a user is operating an application. As a result, the user's face does not become part of the reconstruction of the scene, as opposed to approaches that add a marker or known object to the scene which is then being reconstructed as part of the scene.

The method described in this invention may be used, for example, in relation with vision-based Simultaneous Localization and Mapping (SLAM), such as disclosed in reference [1], which is a well-known technology for creating a geometrical model of a real environment using one or more cameras without requiring any pre-knowledge of the environment. Another common term for the same technology is Structure from Motion (SfM). The geometrical model, that has at least depth information, is also referred to as a 3D map of the real environment. The creation of the geometrical model of the environment is also called (3D) reconstruction of the real environment. The created (or typically called reconstructed) geometrical model could be represented by a plurality of 3D features, such as point features or edge features. The 3D features describe physical 3D features (also referred to as the structure) of the real environment. A real environment may also be called a real scene, a real object, or may be understood to comprise one or more real objects.

The reconstructed geometrical model can be used in different applications. For example it can be visualized on a display, or printed with a three-dimensional printer. It can also serve as a basis to measure spatial distances between points on the real object.

The reconstructed geometrical model can also be used for determining a pose (i.e. position and/or orientation) of a camera relative to the real object based on a current image the camera captured of the real object. By matching extracted 2D features of the current camera image with 3D features existing in the geometrical model, e.g. by means of local image feature descriptors (reference [20]), a plurality of 2D-3D correspondences can be established. Then, the camera position and orientation in a coordinate system of the geometrical model can be computed based on the correspondences. This procedure is referred to as camera pose estimation and sometimes also referred to as tracking a camera. The problem of tracking a camera relative to a real object can also be expressed as the problem of tracking a real object relative to the camera. If one of the two problems has been solved, the solution of the second problem is the inverse of the solution of the first problem. Therefore tracking a camera and tracking an object can be used interchangeably when discussing the overall concept.

Vision-based SLAM performs camera tracking and reconstruction of the environment in parallel. It facilitates many applications, such as vision-based navigation of a robot system or a vehicle. Particularly, it is a promising technology that supports Augmented Reality (AR) systems or applications (see reference [3]) in an unknown real environment.

An aim of the invention is to determine the absolute scale of a reconstructed geometrical model of a real environment such that the coordinate system of the geometrical model is at absolute scale, meaning there is a known scaling factor mapping from coordinate system units of the reconstructed geometrical model to absolute spatial units as they are in the real world. For example the model can be scaled to millimeters, such that a model unit in the model corresponds to a millimeter on the real object. In this case, if two points in the model are 56 units apart, the corresponding points on the real object are 56 mm away from each other. Defining a model at absolute scale can be implemented such that a unit in the model coordinate system corresponds to any real-world distance (e.g. 12.34 meters) as long as this distance is known.

Thus, at least one scale factor may be determined that could be used to scale a plurality of 3D features defined in a coordinate system associated with a geometrical model describing a real object.

In one embodiment, the present invention determines a scale factor which scales the coordinates of an existing model of a real object defined at arbitrary scale to a coordinate system which is defined at absolute scale.

In another embodiment, the present invention determines the distance between at least two cameras at absolute scale, which then enables reconstructing a 3D model at absolute scale of a real object visible in the camera based on images of the two cameras.

We may determine the scale factor between the spatial coordinate system where the spatial properties of the features are defined in and a real world metric, e.g. centimeters. If the coordinate system in which the position of features is defined is already given, the scale factor can be potentially used to scale the coordinate system (and the spatial coordinates of the features respectively) to have a one-to-one scaling to a real-world metric (like one unit=one mm). If the coordinate system in which the position of features is defined is not yet determined, we can potentially use the scale factor to directly initialize the coordinate system (and the spatial coordinates of the features respectively) to have a one-to-one scaling to a real-world metric (like one unit=one millimeter).

Further, the coordinate system can also be kept as is. For operations that require the absolute scale (i.e. representing the real-world scale), the determined spatial scale factor then can be used for extracting real-world spatial distances or transform poses or spatial coordinates of features to a coordinate system that has a one-to-one scaling to a real-world metric.

In another embodiment, two poses at absolute scale are provided for two images of a first camera, e.g. world-facing camera at two points in time, used for reconstruction of the scene structure by triangulation. The two poses at absolute scale could be provided by a face tracking method based on images captured by a different camera facing the user, in the following referred to as user-facing camera, with a known spatial transformation with respect to the first camera.

In many potential scenarios, a user holds a mobile device equipped with a world-facing camera. The world-facing camera may be used to capture images of the surrounding environment, for example to superimpose these with virtual objects in Augmented Reality applications or for other image processing applications. In such applications, it is often required to reconstruct a real object in the surrounding environment and/or to estimate camera poses or motions of the camera relative to the real object or the environment.

In a scenario such as illustrated in FIG. 6 below, where we have an additional front-facing (also referred to as user-facing) camera, we can use an image of the face of a user, who operates the application and is therefore already present in the real environment, to estimate the absolute scale of the map (i.e. 3D reconstruction) created based on images captured with the world-facing camera.

This has various advantages: The face of the user is available, so no extra geometry or object has to be added, and it is captured by the user-facing camera, so no tedious setup is required. Since the user typically looks at the screen in order to experience the application, the user-facing camera can always capture the face of the user, while the world-facing camera can capture the view of the real environment. As the face of the user is always available as long as the user is facing or looking at the display of the handheld device, dynamically updating or redoing the scale estimation can be supported. The geometry of a human face is also limited in range of variation in geometry and thereby allows valid assumptions and restrictions about the dimensions and the scale of facial features for the majority of humans. This means, the scale estimation can be done by everyone without the need of an additional known object using only the user's face and the capture device. A particular user can also do a special calibration for his or her own face, allowing for a higher precision. A face recognition procedure, which allows to distinguish between a multitude of people, e.g. in reference [19], can also be incorporated to recognize which user is present in the image of the user-facing camera, and then selecting the according correct absolute dimensions of the user's face from a previously set-up database. The face recognition procedure can either run locally or be executed remotely accessible through network connection. The previously set-up database containing correct absolute dimensions of the user's face can be either provided locally or remotely, accessible through network connection.

Another embodiment uses a visual face classification method, e.g. as disclosed in reference [12], to determine properties such as the age, gender, ethnicity, weight, or height of humans and then uses a generic face model for the determined class of humans.

The two cameras (e.g., world-facing and user-facing camera) may be used in combination with the assumption of a known spatial relation between the coordinate systems of the two cameras, e.g. a rigid body transformation. The world-facing camera may be used for determining a pose of the world-facing camera relative to a real environment in a coordinate system associated with the real environment and/or an object coordinate system associated with a real object located in the real environment. This would allow a desired alignment between virtual objects that can be superimposed on the camera image and the real object in the real environment in the image captured by the world-facing camera. Assuming the known transformation between the coordinate systems of the two cameras, the absolute scale information from the face of the user captured by the user-facing camera can be transformed into the real environment coordinate system and/or the object coordinate system. This would allow SLAM reconstruction at absolute scale using the world-facing camera.

For each viewpoint of a camera setup comprising a user-facing camera and a rigidly connected world-facing camera, we can determine a pair consisting of two poses: the pose of the user-facing camera relative to the user's face at absolute spatial scale, and the pose of the world-facing camera relative to the first real object at arbitrary scale. Given the spatial transformation between the user-facing camera and the world-facing camera, we can determine the pose of the world-facing camera relative to the user's face at absolute spatial scale by transforming the pose of the user-facing camera relative to the user's face at absolute spatial scale with the spatial transformation between the user-facing camera F and the world-facing camera.

Given two such transformed poses, resulting from two different viewpoints of the dual camera setup, we can determine the translational distance D_abs between the two poses of the world-facing camera at absolute scale. Using the two poses of the world-facing camera relative to the first real object defined at arbitrary scale, we can determine the translational distance D_arb between these two poses at arbitrary scale.

Finally, a scaling factor from the arbitrary scale of the coordinate system relative to the real object to absolute scale can be determined as the ratio of D_abs and D_arb. S=D_abs/D_arb.

Without referring to the figures, determining the absolute spatial distance between two camera poses PW1 and PW2 of a first camera WC (capturing images of at least part of a real-world object for a SLAM reconstruction) belonging to a capture apparatus C by observing a spatial translation and rotation of a second camera FC (capturing images of at least part of a human face) belonging to the same capture apparatus C using image-based camera pose estimation relative to a face for at least two images, where at least one image I(F1) of the face is taken at camera pose PF1 of camera FC, which means that camera WC at this point of time was in camera pose PW1, and another image I(F2) of the face is taken at camera pose PF2 of camera FC, which means that camera WC at this point of time was in camera pose PW2. At least part of a real-world object may be captured in the images I(W1) and I(W2) by the camera WC at the camera pose PW1 and PW2 respectively. The images I(W1) and I(W2) may be used for real object reconstruction or camera pose estimation applications (e.g. SLAM). The absolute spatial distance between two camera poses PW1 and PW2 should be non-zero for the method to determine spatial properties of the real object at absolute scale.

In one embodiment the scale estimation is not only based on two corresponding pairs of poses PW and PF (i.e. PW1 and PF1 as well as PW2 and PF2) determined by the corresponding captured four images at these poses (like basically illustrated in FIGS. 2a and 2b), but on a multitude of pairs of poses PW and PF, each of which is determined by a captured image. Multiple scale estimates each based on two pairs of poses (W_i and F_i as well as W_j and F_j) can be combined using for example a model fitting method such as median, mean or RANSAC. The model fitting method may additionally consider suitability of certain pose pairs for the scale estimation, for example based on a minimum distance between the poses or uncertainty and quality ratings of the pose measurements. Also the coherency between the difference from F_i to F_j in rotation of the user-facing camera and the difference from W_i to W_j in rotation of the world-facing camera can be used for example as a rating for uncertainty and/or quality of a pose measurement and an indicator for whether the second real object has moved with respect to the first real object or not. The rotational part between the two poses of the user-facing camera can also be used to determine if the poses are suitable for the scale estimation. When neglecting the real transformation between user-facing and world-facing camera, and assuming they have the same origin, a rotational part between the two poses of the user-facing camera may introduce an error for the scale estimation (see FIGS. 8a, 8b, and 8c) and it is therefore preferable to only have negligible/small rotations. The two whole trajectories of poses (one trajectory for the user-facing camera, one for the world-facing camera) can also be used to evaluate, how likely it is that the face has not moved during the capturing. This can for example be evaluated using a method as disclosed by Umeyama (reference [10]) aligning the two trajectories and computing the residual error after registration. If the residual error is above a particular threshold, this may be indicative of that the head moved relative to the real object. In this case, a determined scale factor may be discarded and calibration may be restarted. Also the coherency between the rotation of the user-facing camera and the rotation of the world-facing camera can be used to support aligning the two trajectories and be considered when computing the residual error.

Modern handheld and mobile devices, such as mobile phones, pads, or tablet computers, may have two equipped cameras (e.g. a user-facing camera and a world-facing camera) pointing into two opposite directions. The display of the mobile device usually faces in the same direction as the user-facing camera does.

A possible embodiment of the invention is estimating absolute scale from images of the face of the user captured by the user-facing camera. This absolute scale is then applied for the reconstruction and for tracking real objects at absolute scale using another camera (e.g. a world-facing camera that points to the opposite direction compared to the user-facing camera and usually has a known spatial transformation relative to the user-facing camera). The two cameras may be attached to a handheld device or a mobile device, e.g. a mobile phone, a pad, or a tablet computer. Further, a display device, e.g. an LCD screen, may be attached to the mobile device.

The two cameras of a mobile device may have a fixed spatial relationship, e.g. a rigid body transformation, which may be determined from a calibration procedure, e.g. hand-eye calibration, by using at least one known marker or an additional tracking system.

Common approaches in the state of the art require special cameras (with depth sensors based on active stereo or passive stereo or time-of-flight) or additional setups in order to estimate the absolute scale of a real object. This definitely restricts the applicability of these approaches.

One approach of estimating the absolute scale of a SLAM map of a real scene is to detect a known object directly in the images of the camera used as input for the SLAM method (like described in reference [1]) and use the known absolute scale of the known object to infer the absolute scale of the map. One problem of this approach is the necessity of availability of a known object as well as an additional setup step, wherein the extra known object is added to the scene. This changes the original scene and requires the camera to be directed towards the known object.

Compared with state of the art using special objects like a planar marker, like used in reference [1], that have to be placed explicitly in the room and captured by a SLAM camera for the scale estimation, the face of the user has the great advantage that one need not pay special attention to keep the object within the field of view of the user-facing camera during the whole process of reconstruction.

Another significant difference of this invention compared to approaches based on adding an object with known absolute spatial properties to the scene to be reconstructed (reference [1]) is that the present invention does not rely on capturing the known object with the same camera that is used for reconstruction of the real object or scene, but instead uses a second camera to capture the face. Thereby, the face does not become part of the reconstruction as opposed to real objects added to the scene.

As opposed to approaches such as in reference [1] that add a known object to the scene and thereby require a camera-equipped computer, a user, a real object to reconstruct, and an additional special known object for calibration that a user would need to carry around, the present invention in contrast only requires a camera-equipped computer, a user, and a real-object to reconstruct.

According to embodiments of the present invention, one significant advantage in determining the absolute scale of a SLAM reconstruction is the explicit use of the absolute distance between two or more facial features or fiducials (e.g. a distance between the two eyes of the face or a distance between an eye and the mouth of the face or a distance between the left and the right corners of an eye). These may be recognized in an image of the user captured by a user-facing camera (i.e. a camera pointing to the user or pointing to an image of the user reflected by one or more optical instruments, e.g. mirrors or optic lenses, for capturing the user's face) when the user is observing the display device. This allows the application of a-priori knowledge about human faces and their absolute spatial properties. The images of the face are typically captured by a user-facing camera and are used for estimating the absolute scale instead of relying on additional objects of known geometry in the scene for scale estimation. By explicitly using the face (e.g. using face specific characteristics), which is mostly or always available over the whole duration of the user observing the display, the scale can be estimated at any time without taking influence on the scene. Additionally by focusing on the face, which has a limited range of variation in terms of geometry between all humans, specialized algorithms for estimating the scale from the face of the user can be applied. Regions of the face particularly suited for estimating the scale can be pre-learned and/or pre-defined. These regions can be registered in live tracking via established algorithms of face detection and pose tracking.

Regions of the face that could have a bad impact on the scale estimation, e.g. because they differ significantly among different people in terms of size and shape, can be taken into account and excluded from the scale estimation (like nose size, or ear size).

In one embodiment, the normal of the display device of the mobile device and the optical axis of the user-facing camera are preferred to have the same direction. In this case, as the user would observe the visual information (e.g. of an augmented scene) on the display device, the face of the user would mostly or always be captured by the user-facing camera. Thus, the absolute scale could be always estimated based on images of the face.

For example, the processing system according to the invention is comprised, at least in part, in a mobile device (such as a mobile phone, wearable computer, tablet computer, mobile computer, often called laptop, or a head mounted display, such as used for optical see-through augmented reality applications) and/or in a server computer adapted to communicate with the mobile device. The processing system may be comprised in only one of these devices, e.g. in the mobile device or in the server computer, or may be a distributed system in which one or more processing tasks are distributed and processed by one or more processing devices of the processing system which are distributed and are communicating with each other, e.g. by point to point communication or via a network.

According to an embodiment, the system comprises a mobile device which comprises one or more cameras and, for example, a display screen.

Any steps, embodiments, aspects and examples described herein with respect to the method can equally or analogously be implemented by the processing system being configured (by software and/or hardware) to perform the respective steps, embodiments, aspects or examples. Any processing device used within the processing system may be configured as such by software and/or hardware and communicate via a communication network, e.g. via a server computer or a point to point communication, with one or more cameras, displays and/or any other components.

According to another aspect, the invention is also related to a computer program product comprising software code sections which are adapted to perform a method according to the invention. Particularly, the software code sections are contained on a computer readable medium which is non-transitory. The software code sections may be loaded into the memory of one or more processing devices (such as microprocessors) as described herein. Any used processing devices, such as one or more microprocessors, may communicate via a communication network, e.g. via a server computer or a point to point communication, as described herein.

BRIEF DESCRIPTION OF THE DRAWINGS

Aspects and embodiments of the invention will now be described with respect to the drawings, in which:

FIG. 12 illustrates another embodiment of the present invention.

DETAILED DESCRIPTION

It is a commonly known problem that approaches to determine the structure of a real object based on a set of images captured by a monocular capture apparatus result in a reconstruction of the spatial (or geometrical) structure which is up-to-scale. This means the reconstruction uses spatial units for which the scaling factor to absolute spatial units, such as meters, is unknown. In many applications, it is desirable to obtain a reconstruction in absolute units, also referred to as "at absolute scale". For this, the knowledge of at least one distance at absolute scale may be used, either between parts of the real object or between positions of the camera relative to the real objects at the time when the respective images for reconstruction were taken. This distance at absolute scale could for example be the eye distance either for a particular human or a generic eye distance or any other spatial property of facial fiducials. When having a capturing apparatus that captures a face and the real object, embodiments disclosed herein use the face to determine a distance at absolute scale. The capturing apparatus can be a single camera or a set of rigidly connected cameras, e.g. such as in a mobile phone. There the front facing camera usually captures the user's face while the back-facing camera captures the real object.

Advantageously, the invention takes advantage of the user's face (which is not identical but has similar properties for most people), which may preferably be used in handheld Augmented Reality.

The invention enables reconstruction of the structure of a real object or environment at absolute spatial scale, in the following also simply referred to as at absolute scale. This for example enables camera pose tracking at absolute scale and it enables superimposing virtual objects which are defined at absolute scale to be at a consistent scale with the reconstructed real object. It also allows doing measurements of the real space, enabling calculations that are based on absolute spatial scale like physical simulations (e.g. acceleration due to gravity) or collision detections between virtual and real objects (e.g. would a object spatially fit into the real-word).

Instead of using a known object (i.e. marker) that needs to be added to the scene, embodiments of the invention use the user's face, which is always there. As opposed to other approaches, the invention does not require any user input, it does not require inertial sensors, and provides more accurate results than consumer-grade inertial sensors do.

Figure 1:
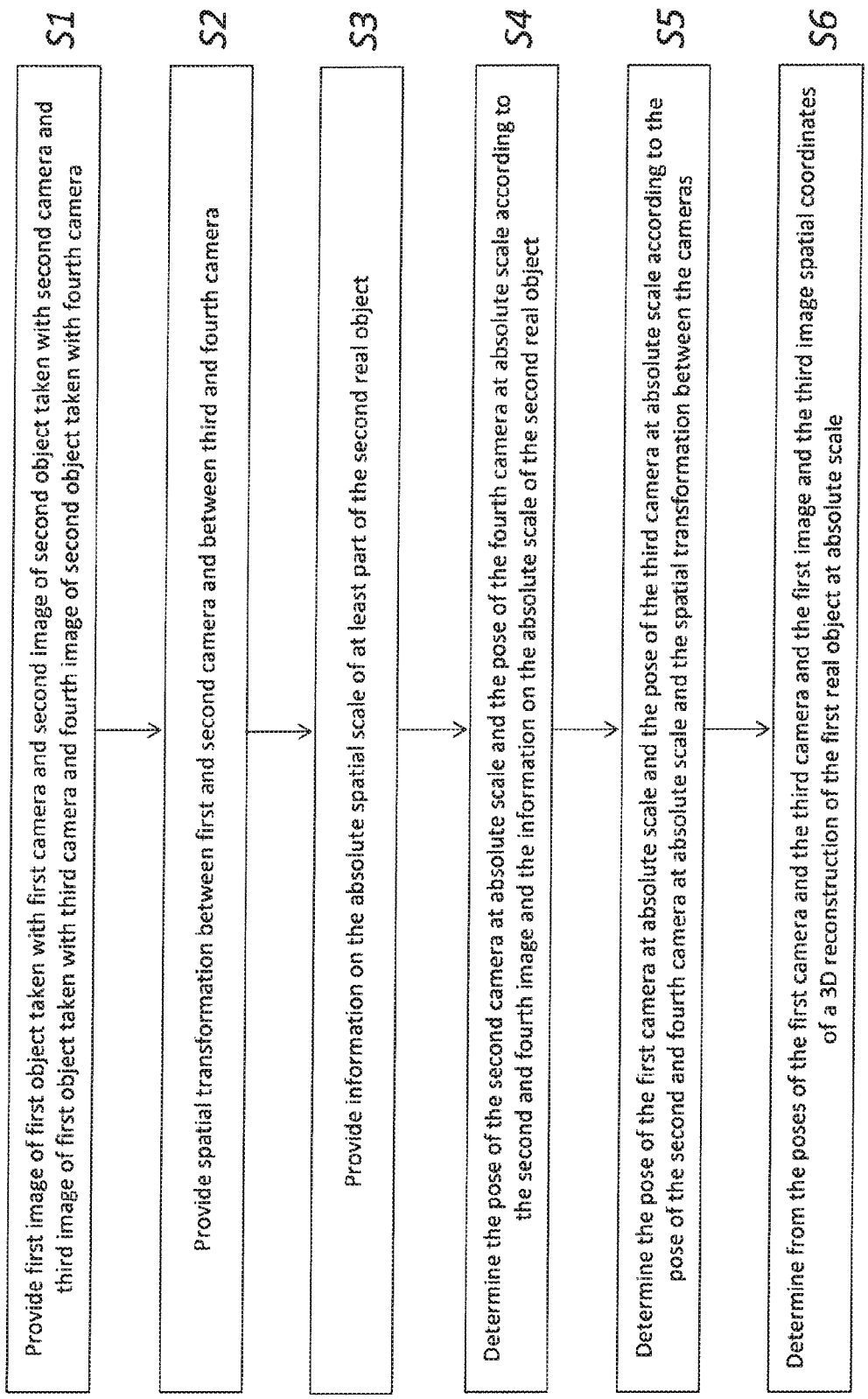
FIG. 1 shows a flowchart of a method according to an embodiment of the present invention.

FIG. 1 shows a flowchart of a method according to an embodiment of the present invention. In a first step S1 a first image including at least part of the first real object captured with a first camera and a second image including at least part of a second real object captured with a second camera and a third image including at least part of the first real object captured with the third camera and a fourth image including at least part of the second real object captured with the fourth camera is provided. In a second step S2 a spatial transformation at absolute scale between the first camera and the second camera and a spatial transformation at absolute scale between the third camera and the fourth camera are provided. In a third step S3 information on the absolute spatial scale of at least part of the second real object is provided. In a fourth step S4 at least part of the pose of the second camera at absolute scale is determined according to the second image and the information on the absolute scale of at least part of the second real object and at least part of the pose of the fourth camera at absolute scale is determined according to the fourth image and the information on the absolute scale of at least part of the second real object.

In another embodiment, it is also possible to not determine the full two poses in relation to the second real object (e.g. a human face), that is the pose of the second camera where the second image is captured and the pose of the fourth camera where the fourth image is captured, but to only determine the difference between the two poses, in other words just determine the pose of the fourth camera with respect to the second camera.

In another embodiment, it is also possible to only determine the translational distance between the two poses, i.e. just determine the distance between the pose of the fourth camera and the pose of the second camera.

In a next step S5 at least part of the pose of the first camera at absolute scale is determined according to the pose of the second camera and the spatial transformation between the first camera and the second camera and at least part of the pose of the third camera at absolute scale is determined according to the pose of the fourth camera and the spatial transformation between the third camera and the fourth camera.

In another embodiment, it is also possible to not determine the full two poses in relation to the first real object, that is the pose of the first camera where the first image is captured and the pose of the third camera where the third image is captured, but to only determine the difference between the two poses, in other words just determine the pose of the third camera with respect to the first camera.

In another embodiment, it is also possible to only determine the translational distance between the two poses, i.e. just determine the distance between the pose of the third camera and the pose of the first camera.

This distance can then be used together with the estimated distance between the second and the fourth camera to determine an absolute scale factor for the first camera (e.g. a so-called world-facing camera or back facing camera). For example, the scale factor could define true sizes of reconstructed geometrical models of real environments or be used to map coordinates of a reconstruction at an arbitrary scale to absolute scale.

In a step S6 spatial coordinates of a 3D reconstruction (also called a geometrical model) of the first real object at absolute scale are determined from the at least part of the pose of the first camera and the at least part of the pose of the third camera and the first image and the third image, or determined from the difference between the two poses, or determined from the distance between the two poses.

In another embodiment, the absolute scale factor for the first camera (e.g. world-facing camera) is calculated by the distance between the first and third camera (in the first common coordinate system) and the distance between the second and the fourth camera (in the second common coordinate systems).

Figure 2B:
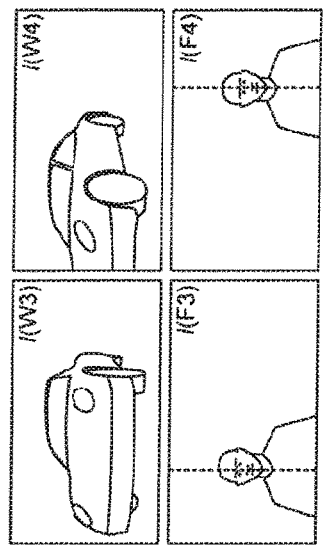
FIGS. 2a and 2b illustrate a possible embodiment of the present invention and an ambiguity in scale when using monocular SLAM or SfM.
Figure 2B:
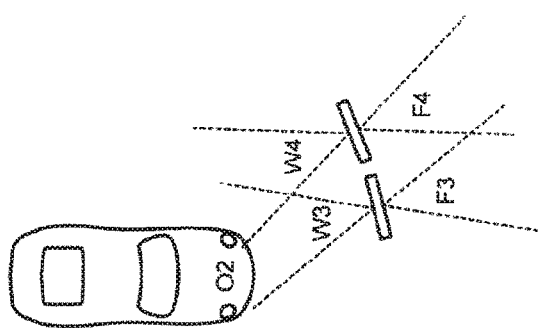
Figure 2B:
Figure 2A:
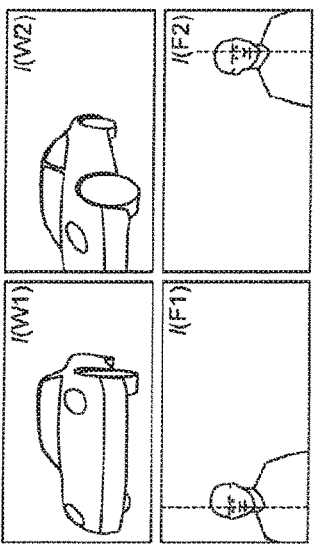
Figure 2A:
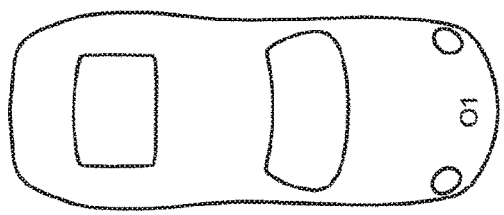
Figure 2A:

FIGS. 2a and 2b illustrate a possible embodiment of the present invention and the ambiguity in scale when using monocular SLAM or SfM. FIG. 2a shows a top-down view of a scene comprising a large car O1 (e.g. a real car for driving), four cameras W1, F1, W2, and F2, which correspond to the first, second, third, and fourth cameras, and a user U1. It further shows in four insets the images I(W1), I(F1), I(W2), and I(F2) taken by the respective four cameras W1, F1, W2 and F2. FIG. 2b shows a top-down view of a scene comprising a small car O2 (e.g. a toy car for children), four cameras W3, F3, W4 and F4, which correspond to the first, second, third, and fourth cameras and a user U1. It further shows in four insets the images I(W3), I(F3), I(W4), and I(F4) taken by the four cameras W3, F3, W4 and F4.

It is assumed that, even though the large car O1 and the small car O2 have a significantly different size, the images I(W1) and I(W3) as well as images I(W2) and I(W4) are substantially identical. This is because the poses of the cameras W3 and W4 are scaled relative to W1 and W2 in the same way as O2 is scaled relative to O1. This shows the ambiguity in scale. It is impossible to determine the absolute size of the car based only on one or more images of it and consequently it is impossible to distinguish the large car O1 from the small car O2 based on the images I(W1), I(W2), I(W3), or I(W4). Consequently, it is also not possible to determine the distance at absolute scale between the camera position of W1 and W2 or W3 and W4 based on the images if the size of the car is unknown. However, if the absolute distance between the camera positions of W1 and W2 was known, e.g. to be 1 meter, then it is also possible to determine the absolute size of the car. There are many applications in which it would be beneficial to determine the absolute size of real-world objects. Thus, according to the present invention, it is advantageous to determine the absolute size of real-world objects and to reconstruct them at absolute scale.

In addition to a car, a user U1 (i.e. a human) is located within both scenes shown in FIGS. 2a and 2b. According to an embodiment of the invention, we capture images I(F1), I(F2) as well as I(F3), I(F4) of the user U1 including his or her face. In one embodiment, the spatial transformations between the camera poses of F1 and W1, F2 and W2, F3 and W3, and between F4 and W4 are known and potentially the same if the images were captured with two rigidly connected cameras, i.e. W1, W2, W3, and W4 are the same physical camera at different points in time and F1, F2, F3, and F4 are the same physical camera at different points in time. In another embodiment, W1, W2, W3, and W4 are different cameras and F1, F2, F3, and F4 are different cameras.

Because the user U1 does not change his/her size between FIG. 2a and FIG. 2b, the corresponding images I(F1) and I(F2) are different from images I(F3) and I(F4), respectively. The position of the face differs more between I(F1) and I(F2) than between I(F3) and I(F4) which is indicative of that the motion between the cameras W1 and W2 is larger than that between W3 and W4. We now assume that at least one spatial property for at least one facial fiducial of the user's face is given at absolute scale, e.g. the interpupillary distance is known to be 63 millimeters (the eye distance 63 mm is known in a generic face model). And we assume that this fiducial, e.g. the eye center position, can be automatically localized in the images I(F1) and I(F2) by means of a face or eye detection algorithm. It is also possible to use other facial points, such as one or more of: positions (of corners, centers or bounding areas), size, shape, outlines, regions, scale, ratios and distances between and the appearance of left and right eyes (pupil, iris, cornea, sclera, inner canthus, outer canthus, center, upper and lower eyelids, eyelashes, . . . ), nasal bridge, nose (Tip, dorsum, alae, nostril, columella, . . . ), philtrum, lips, left and right ears, left and right eye brows, teeth, left and right cheek, jaw, neck, laryngeal prominence. Then the distance between the position of camera F1 and camera F2 can be determined at absolute scale based on the position of the facial fiducials in the images I(F1) and I(F2), because these fiducials have known spatial properties at absolute scale. With the known spatial transformation between camera W1 and F1 as well as between W2 and F2, also the distance between the position of camera W1 and W2 can be calculated at absolute scale. The same applies for W3, F3, W4 and F4.

The camera images I(W1) and I(W2) together with the known distance between the cameras W1 and W2 that took these images finally enables to reconstruct the object O1 at absolute scale or to determine a scale factor which maps an existing reconstruction of O1 at arbitrary scale to absolute scale, i.e. to a coordinate system with a known relation to real-world spatial metrics such as meters or inches.

As a result, the reconstruction of O1 differs from the reconstruction of O2 in terms of scale, which allows distinguishing between O1 and O2.

Figure 3:
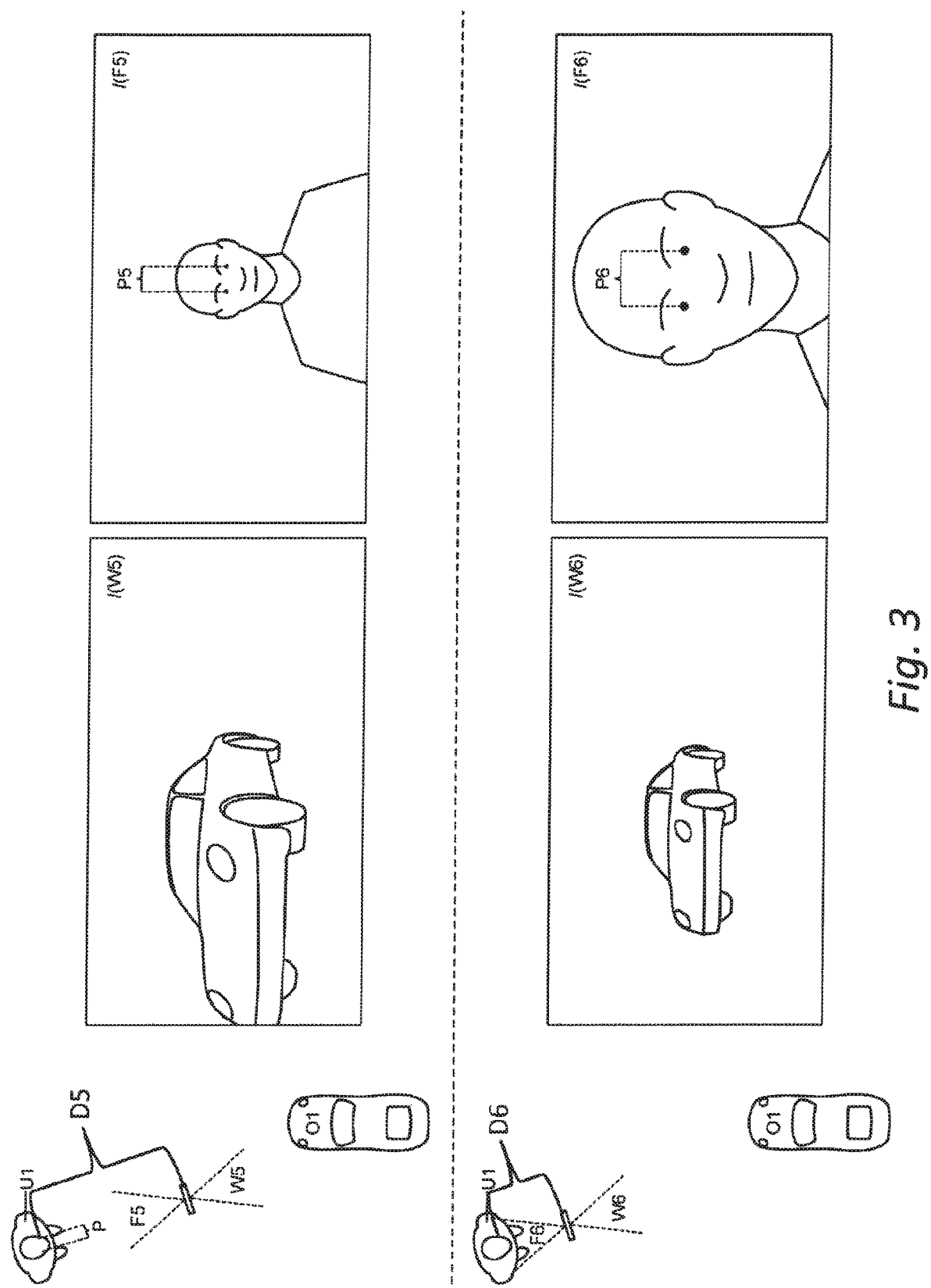
FIG. 3 shows another embodiment of the present invention.

FIG. 3 shows another embodiment of the present invention. A scene is illustrated in a top-down view at two different points in time, the upper part of the figure showing the scene at the first point in time and the lower part of the figure showing the scene at the second point in time. Insets in the right part of the figure show the images captured by the respective cameras. A camera W5 is used to capture an image I(W5) of a car O1 and at the same time a camera F5 with a known spatial transformation to the camera W5 captures an image I(F5) of the user U1 and his or her face. Then both cameras are moved away from the car towards the user resulting in camera poses F6 and W6 and corresponding images I(F6) and I(W6). Again given only the camera images I(W5) and I(W6) it is not possible to determine the absolute size of the car, i.e. the size of the car in the real world. We assume the intrinsic parameters of the cameras F5, W5, F6, W6, particularly the focal lengths, are known. We further assume that the interpupillary distance P of the user U1 is known in absolute units, e.g. in centimeters, in a specific face model or a generic face model used for eye detection or face detection. Furthermore the distances (P5 and P6) between the pupils of the user can be determined in the images I(F5) and I(F6) in pixel coordinates. In the special case when the image plane of the camera F5 has the same distance to both pupils (of the left and right eye), the distance P5 together with intrinsic camera parameters of F5 are sufficient to compute the distance D5 between the point between the pupils and the camera center of F5 at absolute scale, i.e. in absolute real-world units, such as meters, as D5=(f*P)/P5 where f is the focal length of camera F5 in pixels (applies if the face is centered around the principal point of the camera). Analogously, when the image plane of the camera F6 has the same distance to both pupils (of the left and right eye), the distance D6 between the user U1 and the camera F6 can be determined based on the focal length of F6, the pupil distance P6 in image I(F6) and the interpupillary distance P of the user U1 at absolute scale. If the user U1 does not move in the scene relative to the car O1, then the difference between the distances D5 and D6 can be used to determine the distance between the position of camera W5 and the position of camera W6 at absolute scale. This enables determining the absolute scale of the car O1 under consideration of the camera images I(W5) and I(W6).

Figure 4:
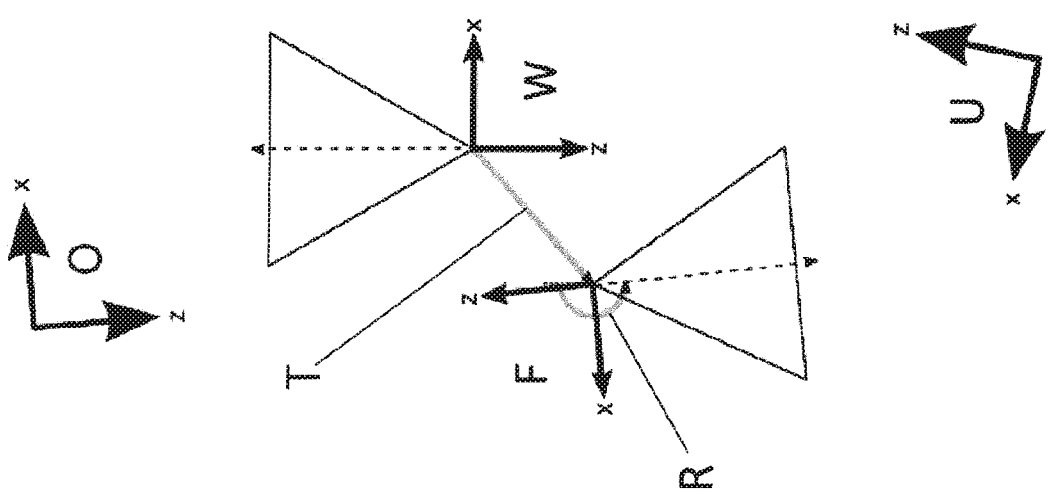
FIG. 4 illustrates involved coordinate systems and transformations according to embodiments of the invention.

FIG. 4 illustrates an embodiment of involved coordinate systems and transformations. The object coordinate system O is defined in absolute units with a known scaling factor to real-world distances, such as meters. The coordinate system W is associated with the world-facing camera (such as W1, W2, etc.) and the coordinate system F is associated with the user-facing camera (such as F1, F2, etc.). When performing SfM or SLAM on images of the world-facing camera, then the coordinate system W of the camera is defined at an arbitrary scale, as discussed above. The transformation (i.e. rotation R and translation T (at absolute scale)) between W and F is assumed to be known. It may be static and calibrated once offline (i.e. before use in the scene), for example if the two cameras are the user-facing and the world-facing cameras of a mobile phone or a tablet computer. The coordinate system F is defined at absolute scale, because its pose is estimated from facial features in the coordinate system U of the user's face, which is defined at absolute scale and the facial features are defined at absolute scale as well. One of the ideas of this invention is now to take advantage of the fact that F may be defined at absolute scale and that the rigid body transformation between F and W is known. As a result, in the present embodiment, also W can be defined at absolute scale, which here would not be possible without the coordinate systems F and U, i.e. without a user-facing camera and the user's face.

Figure 5:
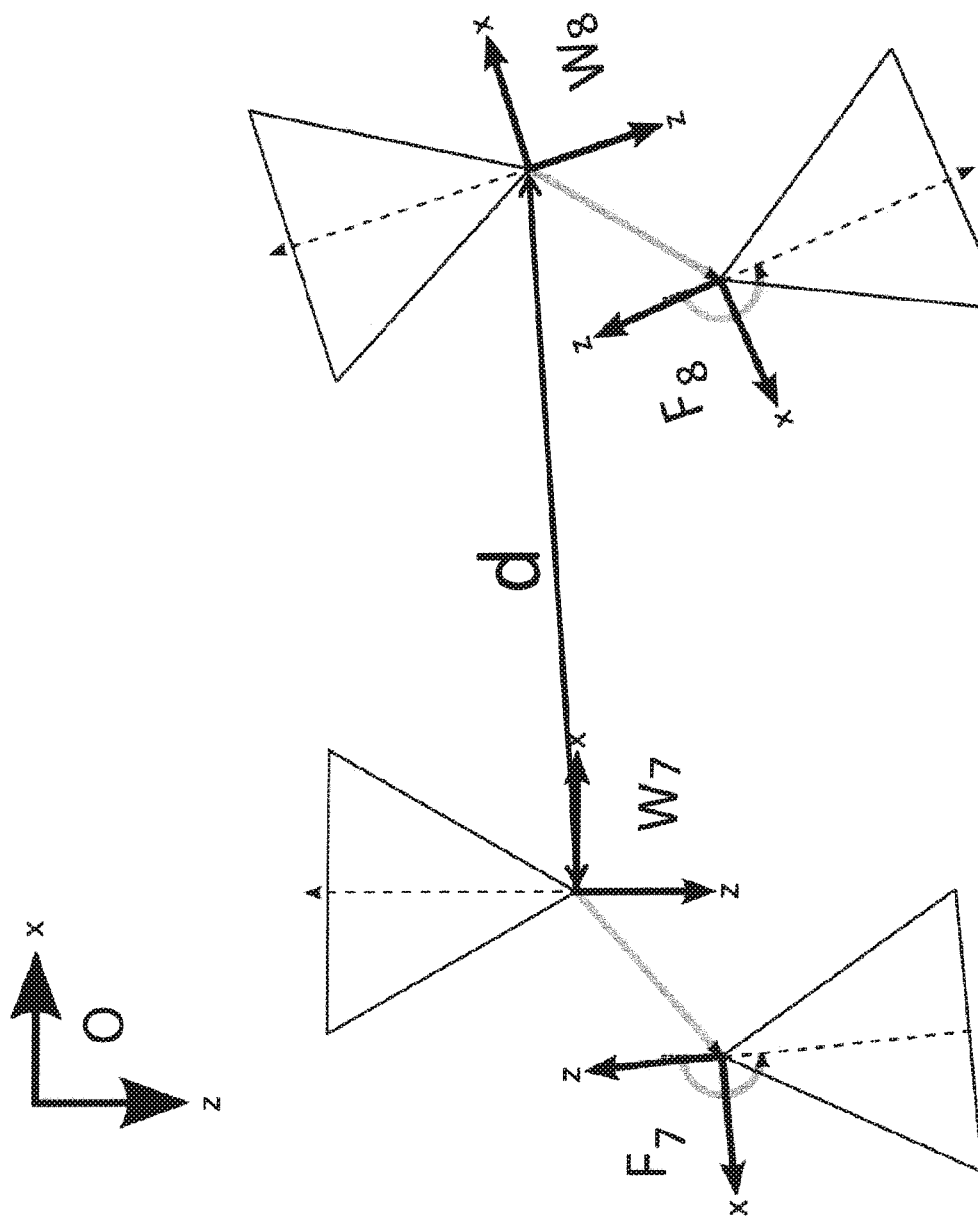
FIG. 5 shows a capturing apparatus comprising a user-facing camera and a rigidly attached world-facing camera at two different poses according to an embodiment of the invention.

FIG. 5 shows an embodiment of a capturing apparatus comprising of a user-facing camera and a rigidly attached world-facing camera at two different poses. The world-facing and the user-facing camera can be at least two separate cameras or a single camera, e.g. an omnidirectional camera capturing a 360° field of view. In this case, the camera images of the respective cameras may be defined as two different parts of the whole image. For a single camera, the poses F and W may be equal.

The cameras used at poses F8 and W8 can either be the same cameras as are used at poses F7 and W7 at a different point in time, or they may be different cameras used simultaneously or at different points in time. The images of the user-facing cameras enable determining information about the spatial distance (which is a scalar value) at absolute scale between the camera positions of F7 and F8 and inferring information about the spatial distance d (which again is a scalar value) at absolute scale between the positions of cameras W7 and W8 as well, because the transformations between F7 and W7 as well as between F8 and W8 are known.

Figure 6:
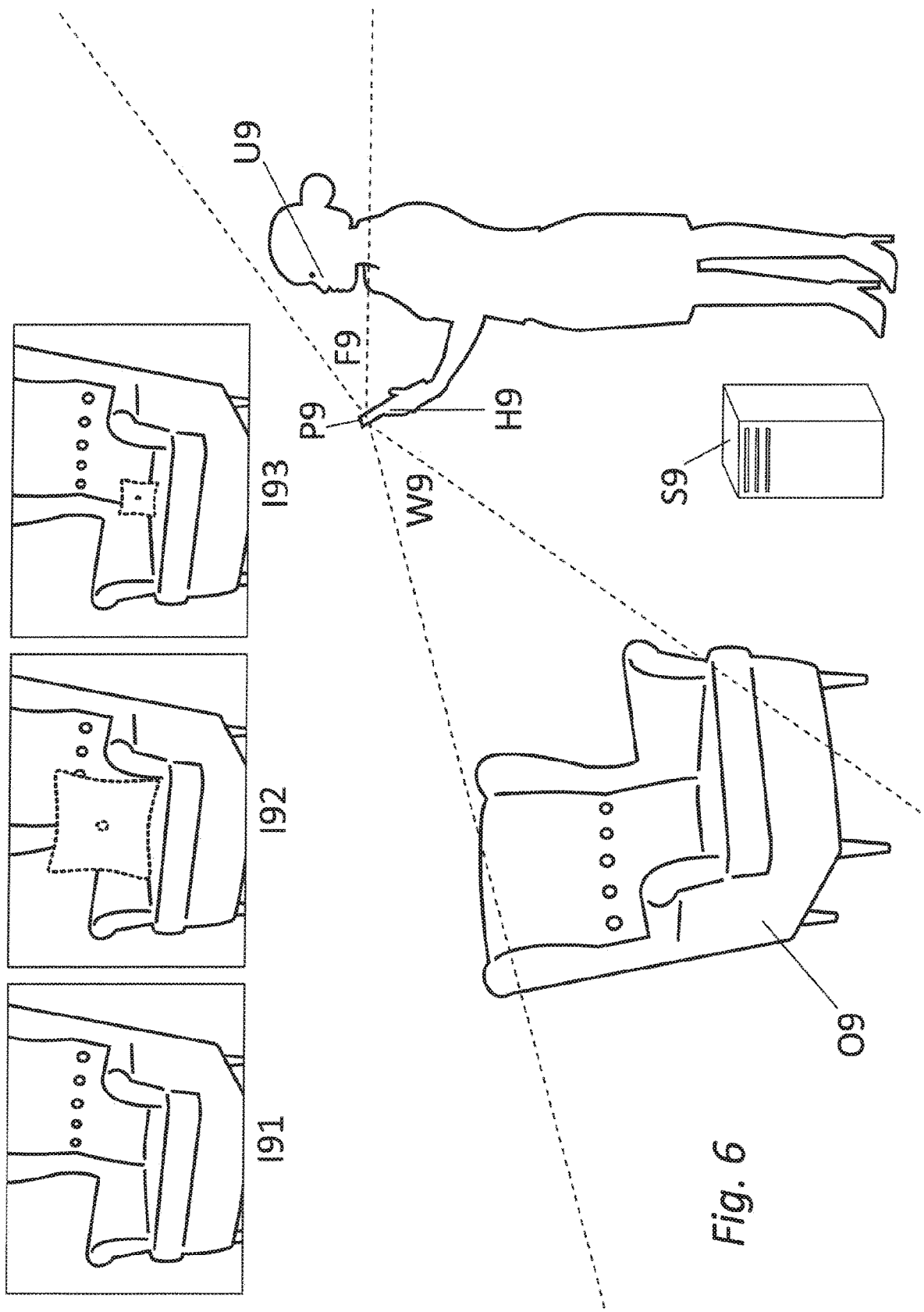
FIG. 6 shows an exemplary embodiment of the present invention implemented with a handheld device.

FIG. 6 shows an exemplary embodiment of the present invention implemented with a handheld device H9 such as a mobile phone, smart phone, phablet, or tablet computer comprising a user-facing camera F9 which captures the user's face U9 and a world-facing camera W9 which captures a real object O9. Further, the handheld device H9 may have a processing device P9 and a wireless network unit. Any step of any embodiment disclosed herein could be either executed locally in the handheld device H9 by the processing device P9 (e.g. a commonly used microprocessor) or sent to a remote server computer S9 or another mobile device through the wireless network unit. The user facing camera, the world facing camera and the display screen of the handheld device may have known spatial relationships between each other.

According to an embodiment, the processing system as described herein may be comprised at least in part in the handheld device H9 and/or in the server computer S9 adapted to communicate with the handheld device H9, e.g. wirelessly. The processing system may be comprised in only one of these devices, e.g. in the handheld device H9 or in the server computer S9, or may be a distributed system in which one or more processing tasks (performing one or more method steps) are distributed and processed by one or more processing devices (such as microprocessors) which are spatially distributed and are communicating with each other.

With such system setup, the user U9 may reconstruct the real object O9, which is a chair in this example at absolute scale by moving the handheld device H9 to at least two different viewpoints while not moving the head U9 relative to the real object O9. This enables determining the pose of W9 at absolute scale when using the reconstruction of O9 as a reference for camera pose estimation. This again enables to superimpose virtual objects (e.g. a virtual pillow) on the camera image 191 of the world-facing camera W9 at absolute scale (see image 192) instead of a wrong arbitrary scale (see image 193). This results in more realistic augmentations that have a consistent scale with the real world in image 192, while the virtual pillow is too small relative to the real chair in image 193.

Figure 7:
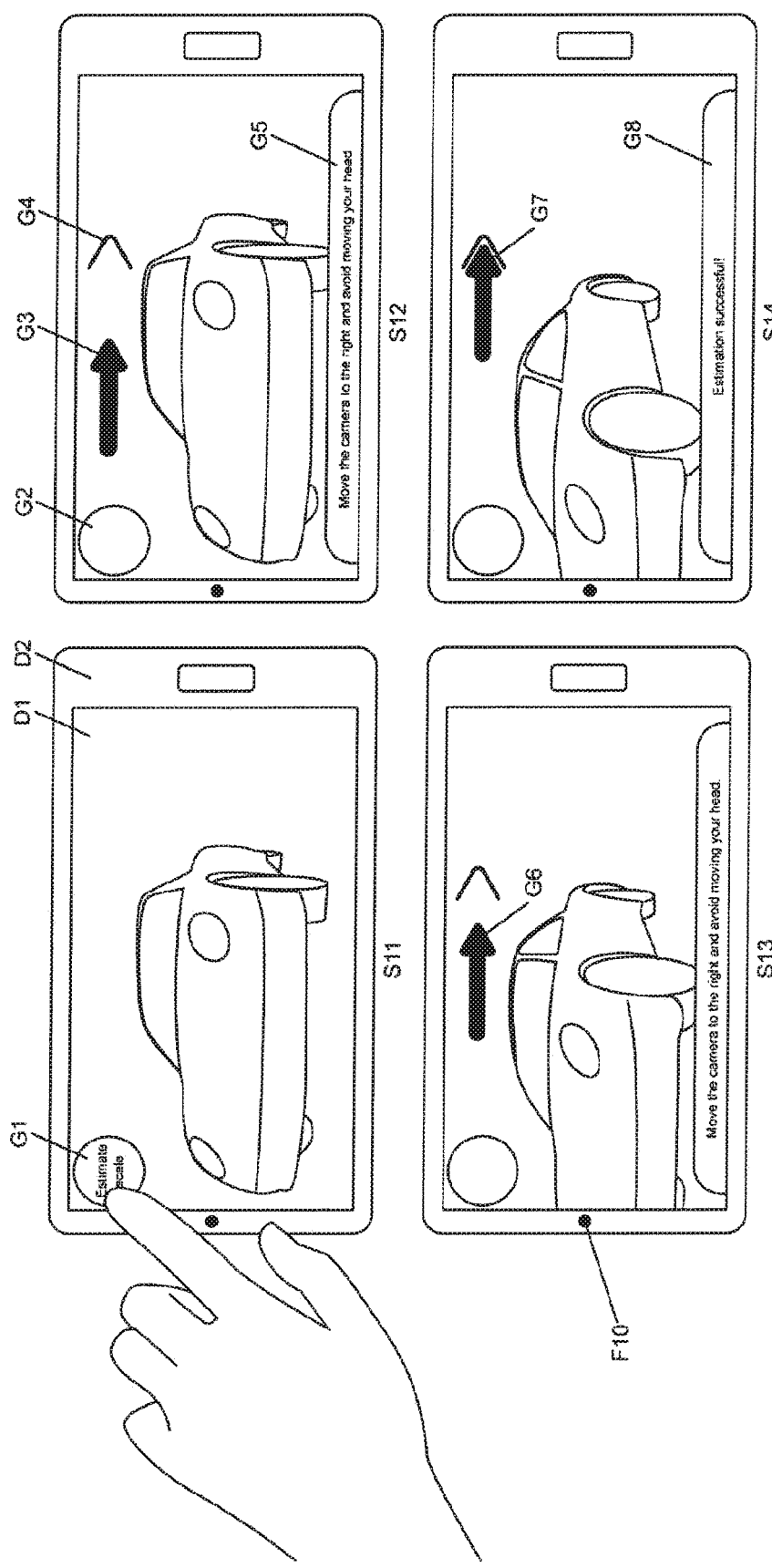
FIG. 7 illustrates an example of a graphical user interface which guides a user through an exemplary process of scale estimation.

FIG. 7 illustrates an example of a graphical user interface which guides a user through a process of scale estimation according to an embodiment of the invention. In this embodiment the method is being performed on a mobile phone D2 comprising a display device D1 (which is a touch screen in this case), a user-facing camera F10 and a world-facing camera at the rear of the phone which is not visible in the figure. In this embodiment, the world-facing camera is repeatedly capturing images of the real object (car) placed behind the mobile phone D2. These images are shown on the display device D1. In the initial state S11 the user can start the scale estimation process by touching a button G1 on the display. From this point on, the user-facing camera F10 is used to determine the pose of the user-facing camera relative to the user's face at absolute scale. Additionally from this point on the world-facing camera is used to determine the pose of the world-facing camera relative to the real object (car) at arbitrary scale. Afterwards, in stage S12, the button changes its appearance to indicate that it is disabled (see empty button G2). Additional graphical user interface elements G3 and G4 appear for giving instructions for camera motion to perform and to visualize the progress of the process. Further, a label G5 may be displayed on the display device providing textual instructions or information. After the user moved the phone (and thereby the world-facing camera) in state S13 the progress indicator G6 adapts accordingly and shows that progress has been made. Once the camera motion is sufficiently large for the scale estimation (S14), the progress indicator G7 visualizes that the target has been achieved. Further, the label G8 may inform the user about the success or failure of the calibration. At his point in time, the user-facing camera as well as the world-facing camera may potentially stop capturing and/or tracking. Afterwards, the application may be in the initial state S11 again, except that potentially the absolute scale of the real object (car) is now estimated and the world-facing camera can determine the pose of the world-facing camera relative to the real object (car) at absolute scale. The user may trigger another scale estimation procedure by touching the button G1 again.

Figure 8A:
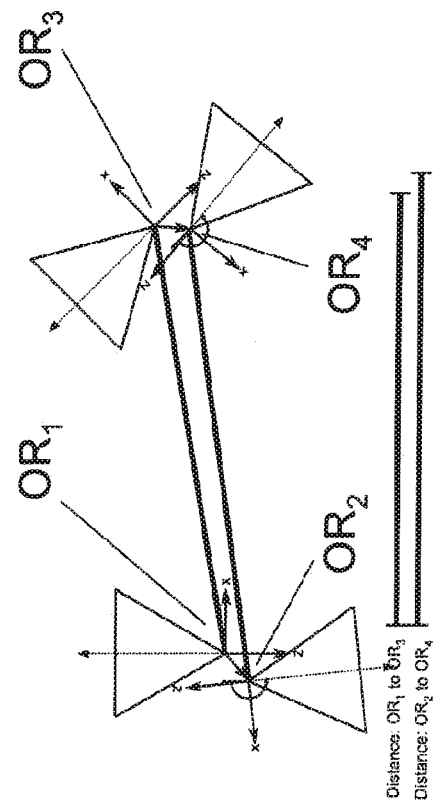
FIGS. 8a, 8b, and 8c illustrate an influence of the spatial transformation between the first and second camera.
Figure 8B:
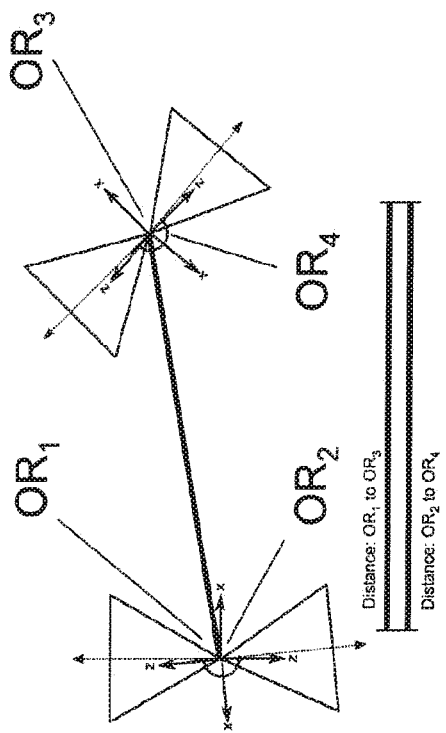
Figure 8C:
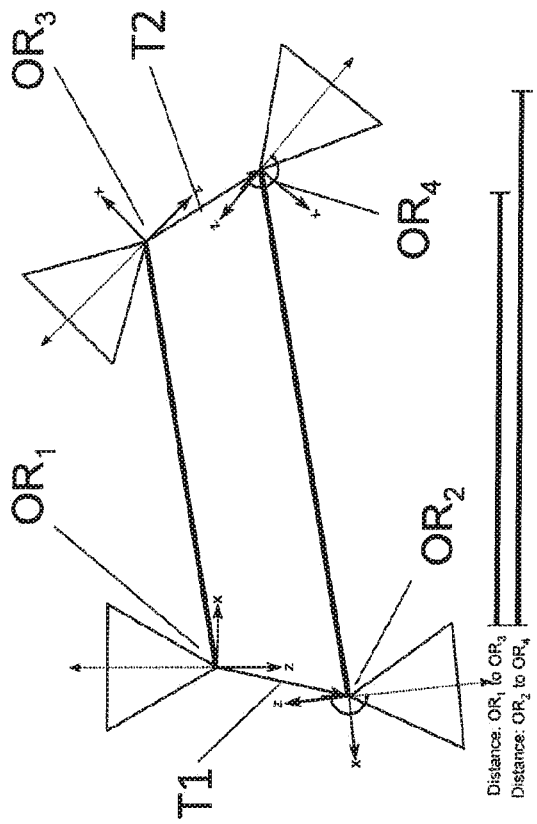

FIGS. 8a, 8b, and 8c show an influence of the spatial transformation between the first and second camera. The first camera and third camera can be implemented by the same physical camera (e.g. a world-facing camera, e.g. of a mobile device) and the second camera and the fourth camera can be implemented by the same physical camera (e.g. a user-facing camera, e.g. of a mobile device). Together, the two cameras (e.g., world-facing and user facing camera) can be seen to form a dual camera with non-overlapping camera frustum between the two cameras.

Three different set-ups of such dual camera are depicted in the embodiment of FIGS. 8a, 8b and 8c differing in the length of the spatial translation between the first camera and the second camera (and thereby also between the third camera and the fourth camera). Each sub figure contains a top-down view of a scene comprising the four cameras, with each sub figure showing the dual camera in two poses with the same poses for the first camera and the third camera in all sub figures. The origins of the cameras are depicted as OR1, OR2, OR3, and OR4. Below each top-down view the absolute spatial distance between the camera origins OR1 and OR3 (at the top) as well as the absolute spatial distance between the camera origins OR2 and OR4 (at the bottom) are plotted. The absolute spatial distance between the camera origins is noteworthy because it contains information about the absolute scale.

The rotational motion between the first camera (index "1") and the third camera (index "3") induces a translational motion between the second camera (index "2") and the fourth camera (index "4") which depends on the length of the spatial translation between the first camera and the second camera and induces a difference in length of the absolute spatial distance between OR1 and OR3 compared with the length of the absolute spatial distance between OR2 and OR4.

In FIG. 8a, where the length of the spatial translation between the first camera and the second camera is zero, the absolute spatial distance between the camera origins OR1 and OR3 (at the top) as well as the absolute spatial distance between the camera origins OR2 and OR4 (at the bottom) are the same.

In FIG. 8b, where the length of the spatial translation between the first camera and the second camera is quite small compared to the translational motion between the second and the fourth camera, the absolute spatial distance between the camera origins OR1 and OR3 (at the top) as well as the absolute spatial distance between the camera origins OR2 and OR4 (at the bottom) are similar but not exactly the same and can be considered equal when allowing a small error to be introduced.

In FIG. 8c, where the length of the spatial translation between the first camera and the second camera is not small compared to the translational motion between the second and the fourth camera, the absolute spatial distance between the camera origins OR1 and OR3 (at the top) as well as the absolute spatial distance between the camera origins OR2 and OR4 (at the bottom) are quite different and cannot be considered equal without allowing a large error.

Based on a provided first spatial transformation between the first camera and the second camera (cf. step e) described above) at least part of the pose (P1F) of the first camera according to the pose P2F is determined (cf. step h)). Also based on a provided second spatial transformation between the third camera and the fourth camera (cf. step e)) at least part of the pose (P3F) of the third camera according to the pose P4F is determined (cf. step h)).

The absolute spatial distance between the pose of the first camera and the pose of the third camera is determined according to the pose of the second camera, a spatial transformation T1 between the first camera and the second camera, the pose of the fourth camera and a spatial transformation T2 between the third camera and the fourth camera, where T1 and T2 may be the same This transformation may potentially be a 6D rigid body transformation that may include a calibration of the relative spatial position and orientation between the first camera and the second camera in a coordinate system at absolute scale. This could be determined using a method such as disclosed in reference [11]. In this case the translational motion between camera 2 and camera 4 induced by a rotational motion between camera 1 and camera 3 is considered and the calculation of the absolute spatial distance between the pose of the first camera (camera 1) and the pose of third camera (camera 3) is exact.

According to another embodiment (cf. second aspect of the invention as described above), the method treats the spatial distance between camera F (second camera) and camera W (first camera) as being zero. Thereby the translational motion between the pose of the third camera and the first camera induced by a rotation between the pose of the second camera and the pose of the fourth camera is being ignored. The induced error for the translational part of the calculated poses of the first camera and the third camera is less or equal to the actual distance between the first camera and the second camera. The error induced for the absolute spatial distance between OR2 and OR4 is less or equal to twice the actual distance between the first camera and the second camera. The error induced also depends on the amount of rotation between the pose of the second camera and the pose of the fourth camera. A rotation of 180° induces the highest error. A nearly translational only motion between the pose of the second camera and the pose of the fourth camera, that is with only negligible rotational part, does only induce a negligible error.

This shows that for camera set-ups with a distance between the first camera and the second camera that is small compared to the translational motion between the second and the fourth camera, the translational part of the spatial transformation between the first camera and the second camera can be considered being an identity transformation. It also shows that for camera motions that have only negligible rotational parts (for the first camera as well as for the second camera) compared to the translational motion between the second and the fourth camera, the translational part of the spatial transformation between the first camera and the second camera can be considered being an identity transformation.

Figure 9:
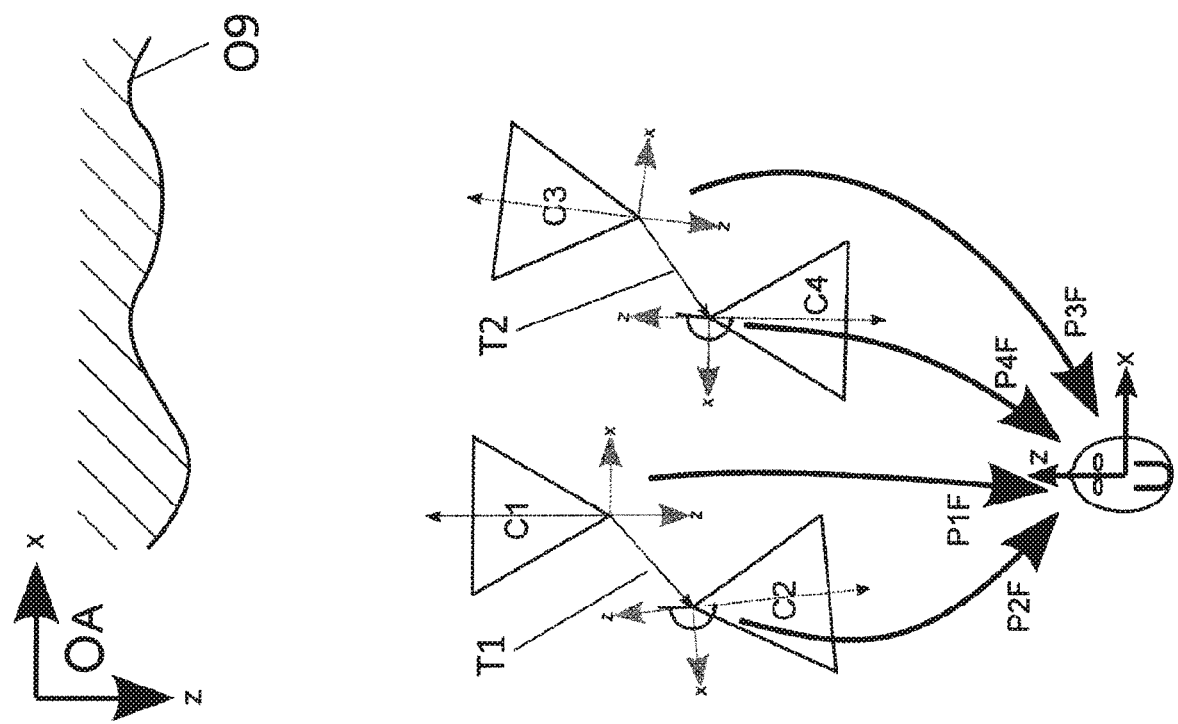
FIG. 9 illustrates another embodiment of the present invention.

FIG. 9 illustrates another embodiment of the present invention in which at least part of the poses of the first camera (e.g. world-facing camera) is used as input to a 3D reconstruction method such that the method results in a reconstruction of the object O9 at absolute scale. The poses P2F and P4F of the two, e.g., user-facing cameras C2 (second camera) and C4 (fourth camera) can be determined relative to the coordinate system of the user's face U at absolute scale using a face tracking algorithm. Given the spatial transformation T1 between cameras C1 (first camera) and C2 (second camera) and the spatial transformation T2 between cameras C3 (third camera) and C4 (fourth camera) the pose P1F of the, e.g., world-facing camera C1 and the pose P3F of the, e.g., world-facing camera C3 can be determined in the coordinate system of the user's face U at absolute scale by means of concatenation. This embodiment then takes advantage of the determined poses of the two world-facing cameras C1 and C3 in a common coordinate system and at absolute scale to create a 3D reconstruction of the real object O9 at absolute scale by means of establishing correspondences in the camera images of cameras C1 and C3 and triangulation of their depths. In this embodiment, the 3D reconstruction method does not estimate the camera poses but uses the provided camera poses at absolute scale instead.

In another embodiment, the 3D reconstruction method estimates the 3D structure of the scene and the camera poses and the solution space for the camera poses is constrained to those pairs of poses that have a translational distance equal to the known translational distance between the two camera poses C1 and C3 as a result of the procedure as explained above.

Figure 10:
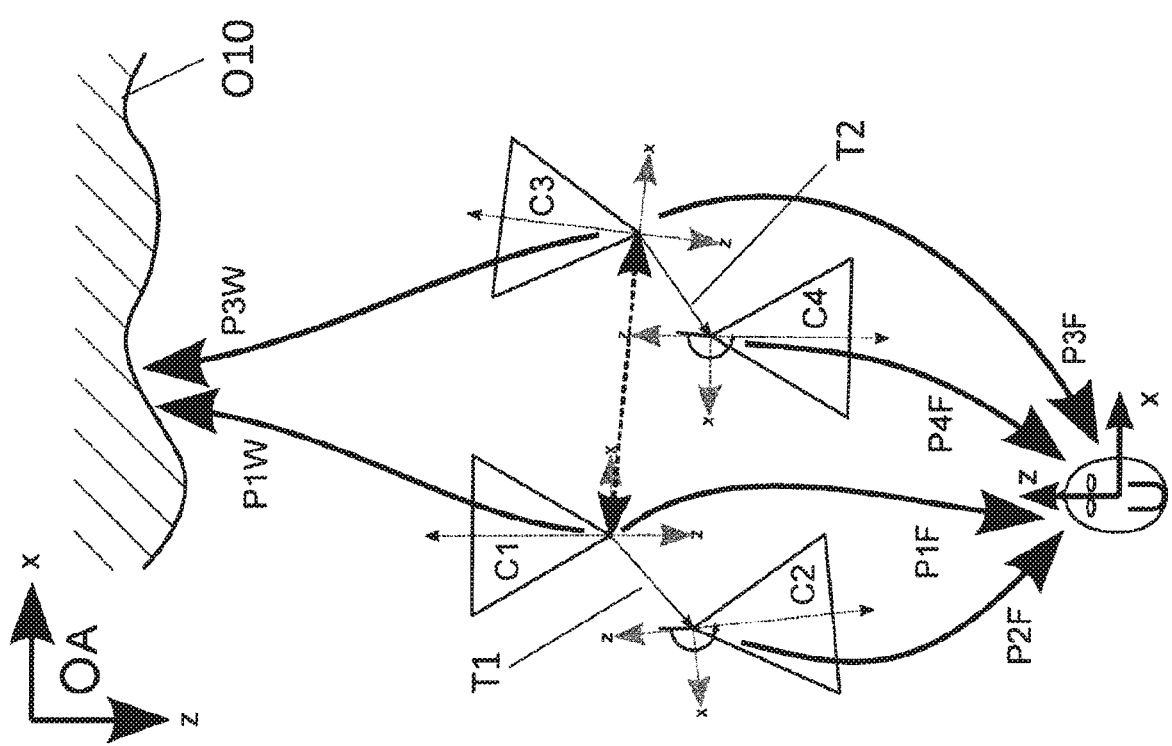
FIG. 10 illustrates another embodiment of the present invention.

FIG. 10 illustrates another embodiment of the present invention in which a scaling factor is determined between a first coordinate system which is defined at arbitrary scale and a second coordinate system which is defined at absolute scale. In this embodiment, the poses P2F and P4F of the two user-facing cameras C2 and C4 can be determined relative to the coordinate system of the user's face U at absolute scale using a face tracking algorithm. Given the spatial transformation T1 between C1 and C2 and the spatial transformation T2 between C3 and C4 the pose P1F of the world-facing camera C1 and the pose P3F of the world-facing camera C3 can be determined in the coordinate system of the user's face U at absolute scale by means of concatenation. Based on these, the translational distance between the position of the camera C1 according to P1F and the position of the camera C3 according to P3F can be determined at absolute scale as D_abs. The camera images of the world facing cameras C1 and C3 can be used to determine the pose P1W of the camera C1 in a coordinate system OA related to the real object O10 at arbitrary scale and to determine the pose P3W of the camera C3 in a coordinate system related to the real object O10 at arbitrary scale based on a 3D reconstruction of the real object O10 at arbitrary scale. Based on these two poses, the translational distance between the position of the camera C1 according to P1W and the position of the camera C3 according to P3W can be determined at the arbitrary scale of the reconstruction of the real object O10 as D_arb. Finally, after determining the translational distance between the position of the camera C1 and the position of the camera C3 in the coordinate system of the reconstruction of the real object at arbitrary scale as D_arb and determining the translational distance between the cameras C1 and C3 at absolute scale as Dabs according to camera poses determined by face tracking at absolute scale, it is possible to determine a scale factor between the arbitrary scale of the coordinate system of the reconstruction of the real object and absolute scale as D_abs/D_arb. This scale factor can be used to scale the coordinates of the 3D reconstruction of the real object O10 such that they are defined at absolute scale after scaling.

In another embodiment, the spatial transformations T1 and T2 are assumed to have a very small translational part which is handled as being zero and, therefore, instead of computing Dabs between the poses of the world-facing cameras C1 and C3 relative to the user's coordinate system at absolute scale, the translational distance Dabs is computed between the two user-facing cameras C2 and C4 relative to the user's coordinate system at absolute scale.

Figure 11:
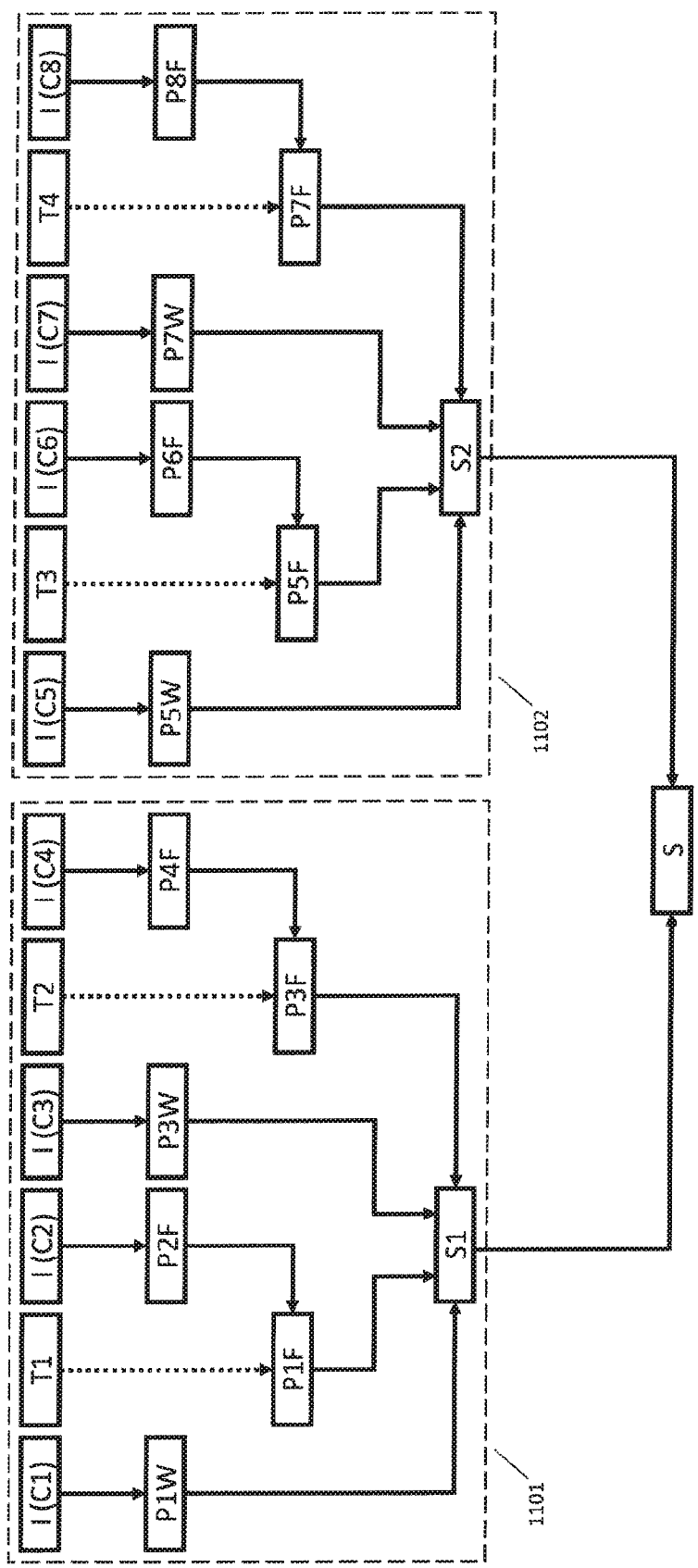
FIG. 11 illustrates another embodiment of the present invention.

FIG. 11 illustrates another embodiment of the present invention and shows how input data may be combined from more than 4 images into a final estimated scale factor according to an embodiment of the present invention.

Box 1101 corresponds to one individual estimation of a scale factor based on four provided images I(C1), I(C2), I(C3), I(C4), and two provided transformations T1, and T2 according to an embodiment of the present invention.

Image I(C1) is the image captured by C1, the first camera, showing a part of the first real object. Image I(C2) is the image captured by C2, the second camera, showing a part of the second real object. T1 is the known transformation between the pose of camera C1 and camera C2. Based on the image I(C1) showing part of the first real object, the pose P1W of camera C1 in the first common coordinate system at arbitrary scale is determined. Based on the image I(C2) showing part of the second real object, the pose P2F of camera C2 in the second common coordinate system at absolute scale is determined. The pose P1F of camera C1 in the second common coordinate system is determined by a transformation of pose P2F using the provided transformation T1. This transformation is optional, meaning the translational part of T1 can be considered being an identity transformation (i.e. the translational part is zero or could be neglected) leading to the translational part of P1F being equal to the translational part of P2F.

Image I(C3) is the image captured by C3, the third camera, showing a part of the first real object. Image I(C4) is the image captured by C4, the fourth camera, showing a part of the second real object. T2 is the known transformation between the pose of camera C3 and camera C4. Based on the image I(C3) showing part of the first real object, the pose P3W of camera C3 in the first common coordinate system at arbitrary scale is determined. Based on the image I(C4) showing part of the second real object, the pose P4F of camera C4 in the second common coordinate system at absolute scale is determined. The pose P3F of camera C3 in the second common coordinate system is determined by a transformation of pose P4F using the provided transformation T2. This transformation is optional, meaning the translational part of T2 can also be considered being an identity transformation (i.e. the translational part is zero or could be neglected) leading to the translational part of P3F being equal to the translational part of P4F.

Based on the translational part of P1W, which is the pose of the first camera C1 in the first common coordinate system, the translational part of P1F, which is the pose of the first camera C1 in the second common coordinate system, the translational part of P3W, which is the pose of the third camera C3 in the first common coordinate system, and the translational part of P3F, which is the pose of the third camera C3 in the second common coordinate system, the scaling factor S1, which scales the first common coordinate system from arbitrary scale to absolute scale, can be determined.

Box 1102 corresponds to another individual estimation of a scale factor based on four provided images I(C5), I(C6), I(C7), I(C8), and two provided transformations T3, and T4 according to an embodiment of the present invention. Thereby images may be different images or partially the same images as used in Box 1101. For example I(C5) and I(C6) could potentially be the same as I(C3) and I(C4) respectively. In another example, I(C7) and I(C8) could potentially be the same as I(C3) and I(C4) respectively.

Image I(C5) is the image captured by camera C5, showing a part of the first real object. Image I(C6) is the image captured by camera C6, showing a part of the second real object. T3 is the known transformation between the pose of camera C5 and camera C6. Based on the image I(C5) showing part of the first real object, the pose P5W of camera C5 in the first common coordinate system at arbitrary scale is determined. Based on the image I(C6) showing part of the second real object, the pose P6F of camera C6 in the second common coordinate system at absolute scale is determined. The pose P5F of camera C5 in the second common coordinate system is determined by a transformation of pose P6F using the provided transformation T3. This transformation is optional, meaning the translational part of T3 can also be considered being an identity transformation leading to the translational part of P5F being equal to the translational part of P6F.

Image I(C7) is the image captured by camera C3, showing a part of the first real object. Image I(C8) is the image captured by camera C8, showing a part of the second real object. T4 is the known transformation between the pose of camera C7 and camera C8. Based on the image I(C7) showing part of the first real object, the pose P7W of camera C7 in the first common coordinate system at arbitrary scale is determined. Based on the image I(C8) showing part of the second real object, the pose P8F of camera C8 in the second common coordinate system at absolute scale is determined. The pose P7F of camera C7 in the second common coordinate system is determined by a transformation of pose P8F using the provided transformation T4. This transformation is optional, meaning the translational part of T4 can also be considered being an identity transformation leading to the translational part of P7F being equal to the translational part of P8F.

Based on poses P5W, which is the pose of the camera C5 in the first common coordinate system, P5F, which is the pose of camera C5 in the second common coordinate system, P7W, which is the pose of camera C7 in the first common coordinate system, and P7F, which is the pose of camera C7 in the second common coordinate system, the scaling factor S2, which scales the first common coordinate system from arbitrary scale to absolute scale, can be determined.

Finally the individual scale estimations S1 and S2 may be combined into a final scale estimate S by means of fitting a mathematical model using for example one or more methods like average, mean, median, probability maximization or RANSAC.

The above example contains two individual scale estimations S1 and S2 and combines them into a final scale estimate. Of course it is analogously possible to perform more than two individual estimations, e.g. 3, 4, 5, or 100, etc., and combine all of them.

FIG. 12 illustrates another embodiment of the present invention and shows how input data may be combined from more than 4 images into a final estimated scale factor according to an embodiment of the present invention.

This example is based on six provided images I(C1), I(C2), I(C3), I(C4), I(C5), I(C6) and three provided transformations T1, T2, and T3 according to an embodiment of the present invention.

Image I(C1) is the image captured by C1, the first camera, showing a part of the first real object. Image I(C2) is the image captured by C2, the second camera, showing a part of the second real object. T1 is the known transformation between the pose of camera C1 and camera C2. Based on the image I(C1) showing part of the first real object, the pose P1W of camera C1 in the first common coordinate system at arbitrary scale is determined. Based on the image I(C2) showing part of the second real object, the pose P2F of camera C2 in the second common coordinate system at absolute scale is determined. The pose P1F of camera C1 in the second common coordinate system is determined by a transformation of pose P2F using the provided transformation T1. This transformation is optional, meaning the translational part of T1 can also be considered being an identity transformation leading to the translational part of P1F being equal to the translational part of P2F.

Image I(C3) is the image captured by C3, the third camera, showing a part of the first real object. Image I(C4) is the image captured by C4, the fourth camera, showing a part of the second real object. T2 is the known transformation between the pose of camera C3 and camera C4. Based on the image I(C3) showing part of the first real object, the pose P3W of camera C3 in the first common coordinate system at arbitrary scale is determined. Based on the image I(C4) showing part of the second real object, the pose P4F of camera C4 in the second common coordinate system at absolute scale is determined. The pose P3F of camera C3 in the second common coordinate system is determined by a transformation of pose P4F using the provided transformation T2. This transformation is optional, meaning the translational part of T2 can also be considered being an identity transformation leading to the translational part of P3F being equal to the translational part of P4F.

Image I(C5) is the image captured by a camera C5, showing a part of the first real object. Image I(C6) is the image captured by a camera C6, showing a part of the second real object. T3 is the known transformation between the pose of camera C5 and camera C6. Based on the image I(C5) showing part of the first real object, the pose P5W of camera C5 in the first common coordinate system at arbitrary scale is determined. Based on the image I(C6) showing part of the second object, the pose P6F of camera C6 in the second common coordinate system at absolute scale is determined. The pose P5F of camera C5 in the second common coordinate system is determined by a transformation of pose P6F using the provided transformation T3. This transformation is optional, meaning the translational part of T3 can also be considered being an identity transformation leading to the translational part of P5F being equal to the translational part of P6F.

Based on poses P1W, P3W, and P5W, i.e. the poses of the cameras C1, C3, and C5 in the first common coordinate system, and poses P1F, P3F, and P5F, i.e. the poses of the cameras C1, C3, and C5 in the second common coordinate system, the scaling factor S, which scales the first common coordinate system from arbitrary scale to absolute scale, can be determined by means of fitting a mathematical model using for example one or more methods like iterative closest point (ICP), the Umeyama method, or Kabsch-method or other methods of least-squares and/or RANSAC model fitting and point based registration.

The FIG. 12 illustrates using 3 cameras capturing the first object and 3 cameras capturing the second object. Of course it is also possible to make use of even more than 3 poses of cameras in the first common coordinate system and corresponding 3 poses of respective cameras in the second common coordinate system, e.g. 4, 5, 6, or 100, etc. pairs of poses in the first and second coordinate system.

In the following, further embodiments of the invention are disclosed without expressly referring to the drawings or figures.

According to a further embodiment, the method assumes that the user's face is positioned statically with respect to the real object to be tracked or reconstructed while capturing images contributing to the scale estimation.

According to a further embodiment, the method detects when the user's face is positioned statically with respect to the real object, and the scale estimation then only uses images which were captured during the time when the user's face is positioned statically with respect to the real object. This can for example be done by comparing the epipolar geometries of two poses of the user-facing camera with the feature movement in the world-facing camera or vice-versa. Another approach to determine whether the head moved with respect to the first real object or not is based on the set of corresponding poses of the user- and the world-facing camera. These poses can be interpreted as 3D points being indicative of the camera position. An algorithm to determine the similarity transformation between two sets of points is for example disclosed by Umeyama [10]. After registration the residual error can be computed. If the residual error is above a particular threshold, the two sets of corresponding poses are considered to not be related by a rigid body transformation. This indicates that the head (i.e. face) has been moved relative to the first real object.

According to a further embodiment, the method deals with and compensates for the motion of the face relative to the first real object by estimating the head motion relative to the real object using visual tracking to estimate the motion of the face in the camera image of the user-facing camera and the motion of first real object in the camera image of the word-facing camera separately.

According to a further embodiment, the method deals with and compensates for the motion of the face relative to the real object by estimating the head motion relative to the real object using visual tracking to estimate the motion of the face and the motion of the background in the camera image of the user-facing camera separately.

According to a further embodiment, the calculation of the absolute spatial distance between cameras W1 and W2 from poses of cameras F1 and F2 may include a calibration of the relative spatial position and orientation between coordinate systems F and W in a coordinate system at absolute scale, e.g. using a method such as disclosed in reference [11].

According to another embodiment the transformation between coordinate systems F and W is a 6 DoF (DoF: Degrees of Freedom) rigid body transformation comprising a 3D rotation and a 3D translation.

According to a further embodiment the method is provided with and considers the spatial distance between coordinate systems F and W.

According to a further embodiment, the method treats the spatial distance between coordinate systems F and W as zero, thereby ignoring the translational movement for the pose of coordinate system (camera) F induced by a rotation of coordinate system (camera) W and vice versa, which leads to an error for poses of cameras F1 and F2 corresponding to poses of cameras W1 and W2 that is less or equal to the actual distance between coordinate system (camera) F and (camera) W.

According to a further embodiment, the method treats the difference in orientation between coordinate systems F and W as 180 degrees, i.e. that the optical axis of the respective cameras are parallel and the cameras are facing in opposite directions.

According to an embodiment the method uses a facial fiducial tracker like disclosed in reference [15] to do face alignment and determine the 2D positions of the facial features and fiducials in the image.

According to an embodiment the method uses a face tracking method delivering the full 6D pose of the user-facing camera in relation to the face like disclosed in reference [16] where a statistical anthropometric 3D rigid model is used as an approximation of the human head. The delivered 6D pose then afterwards is potentially modified in scale and translation by additional specifications for the dimensions of particular facial features, like eye distance.

According to an embodiment the method uses a face tracking method delivering the full 6D pose of the user-facing camera in relation to the face at absolute scale based on a previously acquired, fitted or configured model of the particular face of the user.

According to an embodiment the method uses a face tracking method delivering a 3D pose containing the orientation of the face in relation to the user-facing camera like disclosed in reference [17], and using this 3D pose together with detected facial features, to infer additional translational information about the pose. The viewing angle between the two locations corresponding to facial features can for example be used together with the expected real-world distance between these two locations compensated for the rotation of the head to solve for the distance of the face from the camera. The change in distance between different poses can be used to infer information about the absolute scale of the camera movement.

According to an embodiment the method uses a face tracking method delivering at least a 1D pose containing the left-right orientation (i.e. yaw orientation) of the face in relation to the user-facing camera like disclosed in reference [17], and using at least this 1D pose together with detected facial features that are assumed to be distributed on a horizontal line on the face like the eye centers, to infer additional translational information about the pose. The viewing angle between the two eye centers can be used together with the expected real-world eye distance compensated for the 1D left-right rotation (yaw) of the head to solve for the distance of the face/eyes from the camera. The change in distance between different poses can be used to infer information about the absolute scale of the camera movement.

According to another embodiment the method assumes that poses of cameras F1 and F2 are restricted to being frontal to the face, with pose of F2 differing from pose of F1 in a (approximately) pure translation towards the face or away from the face, using the detected positions of the eyes detected in the captured images by, for example, a method as disclosed by reference [18] and the associated viewing angle between the eyes together with the expected real-world eye distance to solve for the distance of the face/eyes from the camera. This is also illustrated in FIG. 3. The viewing angle between the two eyes can be calculated by the dot product of the respective viewing directions delivering the cosine of the viewing angle. The distance to the face then can be calculated by half the eye distance divided by the tangent of the half viewing angle.

The change in distance between the corresponding poses of cameras F1 and F2 and W1 and W2, respectively, can be used to infer information about the absolute scale of the coordinate systems of cameras W1 and W2.

According to an embodiment, at least for one facial feature a spatial property, for example the human interpupillary distance, is provided in absolute spatial units, whereby the property can be given as a single value or as a probability distribution. The property can be either specified individually for a particular user, or be generic for a plurality of people. Also multiple values/probability distributions can be defined for different groups of people (gender, ethnic groups, age, . . . ) and the relevant group can be selected either by a manual user input or another automatic labelling or classification procedure as for example disclosed in reference [12].

According to an embodiment the particular face is calibrated automatically based on information about absolute scale provided for the second camera (e.g. user-facing camera). The information about absolute scale can for example be provided by depth information about the second real object by depth from defocus, time of flight, structured light, active lighting methods, luminance based methods, photo light, laser rangefinder, multiple frequency phase-shift, interferometry or passive stereo. Stereo methods with a small baseline as is the case for mobile devices may work more reliably on the second camera (e.g. user-facing camera) with the second real object being a face which is close to the cameras, usually closer than 50 cm, in contrast to stereo methods on the first camera (e.g. world-facing camera) with a first real object being located arbitrarily further away than the face. This is because the size of the required baseline for a certain depths "resolution" at the depths of the captured object depends on the distance of the captured object to the camera.

According to an embodiment the particular face is calibrated manually or a generic model is used. Thereby a statistical model also allows to determine uncertainty in scale estimation given how different spatial properties of the face vary among different humans.

The manual calibration of the interpupillary distance can for example be done using a mirror and a ruler. Facing the mirror and keeping the head upright and frontal to the mirror, the ruler is placed horizontally in front of the face, as close as possible and below the eyes, with the measurement markers visible in the mirror. The following measurements should be performed without moving the head or the ruler. Closing one eye, the other open eye can read the measurement at the ruler below the center of the pupil. This process can be repeated with the other eye (close the previously open eye and open the closed one). The difference between the two readings gives the interpupillary distance. A semiautomatic calibration at absolute scale of the interpupillary distance or other facial features can for example be performed using a dual camera set-up, performing camera pose estimation at absolute scale using the images captured by the back facing camera (for example marker based tracking, object tracking or SLAM at absolute scale). At the same time, the facial features to be calibrated are tracked on the user-facing camera. With the user's face being positioned statically with respect to the real-world object used for the tracking on the back facing camera, the absolute scale can be transferred to the facial features by applying the known transformation between the camera poses.

A generic model can for example contain the mean value and the probability distribution for absolute spatial properties of facial features, such as the interpupillary distance, based on statistics as disclosed in reference [13]. Such kind of model may also include information about the uncertainty of a certain value. A generic model can also comprise a multitude of (joint) probability distributions for multiple measurements so that the absolute scale is determined according to the location in parameter space of the maximum probability over the joint probability distributions according to properties of the observed facial features.

According to an embodiment, the method combines absolute scale estimates of different sources (including at least one absolute scale estimation based on at least one image of the user's face), and any of IMU, GPS, known objects in the scene, depths from defocus, manual input, passive stereo, time of flight, structured light, active lighting methods, luminance based methods, projective foreshortening based depth estimation, and the history of scale estimates of previous object reconstructions potentially combined with object classification to only consider previous object reconstructions of previous objects.

According to an embodiment, the scale estimation can be performed as an iterative process using multiple pose pairs each comprising two poses at two points in time. Inconsistencies between different measurements can be detected and the best consensus for the scale can be determined by combining the different measurements by means of for example taking the average, median, histogram based maximum, potentially weighted based on for example uncertainties, age or intra measurement inconsistencies of the individual scale estimations. The combination of the different measurements can also be performed by a model fitting method, such as an implementation of a Bayes filter like a Kalman filter to infer the absolute scale.

Also for many use cases a limited variation in distance between the user's face and the user-facing camera can be assumed, for example with the user being close to the device because he is holding the device or because the user is next to the display device to experience an AR application and thereby also near the user-facing camera. This limited variance in distance makes the scenario more robust for scale estimation with standard cameras. It also allows for applying user-facing depth cameras that only estimate depth in short range and cannot estimate the depth of far away objects, such as the next house.

A possible embodiment of the invention comprises a combination with a user-facing depth camera, which enables scale estimation from the appearance of the face of the user to rely on more accurate information about the actual face model geometry and absolute spatial dimensions. This allows extracting more details and elevates the need to either rely on statistics from basic standard face models or to fit and warp some generic face model or to configure user specific scale values. Another benefit of using a depth camera is that face detection and pose estimation can be performed within very dark or very bright environments or in environments in which the illumination changes strongly and/or frequently. In such environments standard monocular low dynamic range cameras will most probably fail to detect the face and estimate the pose of the face.

Another possible embodiment of the invention comprises a second camera and/or fourth camera being a depth camera (e.g. a user-facing depth camera), which enables scale estimation from any real object present in the frustum of the depth camera, using visual odometry based on depth information. This results in camera poses at absolute scale even if no facial properties are being taken advantage of.

In another embodiment, the second camera and/or fourth camera (e.g. user-facing camera) is an infrared camera, which is particularly well suited to detect and track faces, or it images in at least one of the following bands: extreme ultraviolet, near ultraviolet, near infrared, mid infrared, long-wavelength infrared, or far infrared.

In another embodiment the second camera and/or fourth camera (e.g. user-facing camera) is comprised of multiple cameras, such as a passive stereo camera or any other combination of two or more cameras, potentially imaging different bands of the light spectrum such as visible light, extreme ultraviolet, near ultraviolet, near Infrared, mid infrared, long-wavelength infrared, or far infrared.

According to an embodiment, the method may further comprise detecting a first user input.

According to an embodiment, the user is required to perform a certain motion with the second camera (e.g. user-facing camera), e.g. a 30 cm translation, which is measured based on images captured with the second camera (e.g. user-facing camera). An application may visualize the progress in doing so as illustrated in FIG. 7.

A user interaction may trigger the process of absolute scale estimation. A user interaction may be pressing a button, touching a screen, speech recognition and/or gesture recognition.

In another embodiment, the method is performed without any interaction with the user interface. In this embodiment, the method is performed in the background and determines a scale estimate when the camera motion is suited for doing so.

Moreover, the invention is concerned with a computer implemented user interaction method, as described herein, for a user to interact with a method according to the present invention.

A user input may include one or more user interactions. A user interaction could be one of speaking, running, jumping, blinking, and/or moving any parts of the user. A user interaction may also be pressing a button, touching a screen, speaking into a microphone, gazing or gesturing. The user interaction may also be placing a real object into a field of view of a camera such that the real object is recognized based on an image of at least part of the real object captured by the camera.

The user input then also may be the particular camera motion performed potentially while holding a button. Such particular motion may be moving the camera close to the face and away from the face, or moving the camera up and down, or moving the camera left and right.

A mobile device, as may be used herein, contains at least one camera used to capture images. The mobile device further has a processing device that can be used to perform any of the steps according to the invention as described herein. The mobile device also includes a touchscreen that can display a graphical user interface such that a user can touch or press physical or displayed buttons of the graphical user interface.

Embodiments of the invention are described herein with reference to using a mobile or a handheld device, such as a mobile phone, but the invention may be applied in principle with any processing device, such as implemented in commonly available computer devices comprising one or more microprocessors, for performing the respective steps (such as a wearable computer, tablet computer, mobile computer, often called laptop, or a head mounted display, such as used for optical see-through augmented reality applications). The steps as described herein may also be performed by a network of processing devices, such as a network of computers and/or a mobile device communicated with a server computer.

Embodiments of the invention could be employed in a variety of applications including augmented reality applications that enable placing and displaying virtual objects in a real environment, navigation applications that use the camera to estimate the position and/or the motion of a user, simulations how captured objects would spatially relate to other objects or environments, or measurement applications that aim at measuring distances between points on a reconstructed object at absolute scale.

For example an embodiment of the present invention could be employed in an augmented reality application. A reconstruction of a real object at absolute scale is used as basis to determine the pose of a camera relative to the object based on establishing 2D-3D correspondences between camera images and the reconstructed model of the real object. Such Augmented Reality applications may superimpose virtual 3D objects, such as a virtual chair, on a live view such that they appear to be static relative to the real object. This requires knowledge on the camera pose (i.e. position and orientation) relative to the real object. Since the reconstruction of the real object is defined at absolute scale thanks to an embodiment of this invention, also the pose can be estimated at absolute scale, which enables superimposing the virtual object at absolute scale. Thereby, if the real object is a table and the virtual object is a chair, then the virtual chair would appear at a consistent size with the real table when placed next to it. In contrast, when using a reconstruction at arbitrary scale, the chair might be 5 times as high as the table or only have a fifth of the height of the table, which both results in unrealistic appearance. Having a reconstruction of a real object or environment at absolute scale is particularly crucial in Augmented Reality applications that should provide the user with the opportunity to assess whether certain object would spatially fit into the real environment by superimposing a virtual model of it. For example, such application could be used to visually assess, whether a sofa fits in a living room or if it is too large. Without knowing the absolute scale as provided by this invention, this would not be possible.

In another example an embodiment of the present invention could be used in a measurement application. A reconstruction of a real object is performed at absolute scale using an embodiment of the present invention. A software application might then provide a user with the option to select points on the reconstruction, e.g. by means of pointing and clicking on them with a pointing device, such as a mouse. The application may then compute the (Euclidean) distance between two selected point and display the distance to the user. If such application operates on a reconstruction at absolute scale, as provided by this invention, then the computed distances are at absolute scale, e.g. in millimeters, as well. Contrary, when using a reconstruction at arbitrary scale, measured distances on the reconstruction could only be used to compare distances on the object relative to each other, but all measurements would not relate to absolute units, such as millimeters or inches.

In another example an embodiment of the present invention could be employed in vision-based navigation, which is used to estimate the motion of a user based on visual odometry, to localize the user as well as to provide feedback. It needs to estimate the egomotion at absolute scale in order to update the position relative to the coordinate system, where the map and navigation information is stored in. Without absolute scale only the shape of the covered trajectory is determined and no information about the real distances covered in the real world. Also the shape can be severely distorted over time as a result of drift in scale. Indoor navigation thereby requires long-term robustness and consistency for the measurements. Also velocity can be of interest, which directly depends on the scale of the reconstruction, since it refers to distance divided by time. Without a reconstruction at absolute scale, also the velocity information gained from motion estimation is not at absolute scale.

Even other applications benefit from the very fact, that the scale of a reconstruction is repeatable even if the absolute relation to real-world distances is unknown. This repeatability is accomplished by the presented method. When for example creating reconstructions for several parts of a scene individually it is desirable that the individual maps are defined at the same scale. This makes combining the individual parts of a scene easier. A repeatable scale also allows overcoming scale drift that can happen during longer reconstruction runs.

Generally, in the following, a further explanation of terms is given and the following further aspects and embodiments may be applied in connection with aspects of the invention.

A camera as used herein is an image capturing device to capture imagery information of real objects. Intrinsic camera parameters of the at least one camera or cameras may be provided or calibrated. The present invention can be applied with receiving image information from any camera providing images of real objects. It is not restricted to cameras providing color images in the RGB format. It can also be applied to any other color format and also to monochrome images, for example to cameras providing images in grayscale format. The used camera or cameras may further provide an image with depth data. The depth data does not need to be provided in the same resolution as the (color/grayscale) image. A camera providing an image with depth data is often called RGB-D camera. A RGB-D camera system could be a time of flight (TOF) camera system or a camera system using structured light. The at least one camera or cameras could also capture light that is invisible to human eyes. For example, the at least one camera or cameras may be an infrared camera capturing infrared lights.

A real object may be any object that has a physical geometric shape in the real world. The real object could further include one or more real objects. For example, the real object may be an interior of a room or a vehicle. The real object could also be, for example, a chair, a building, a mountain, a tree or a table. An interior of a room (as a real object) may further include a chair and/or a table. A real object is also referred to herein as real environment or real scene. The real object can also be an arrangement of a plurality of real objects. For example, an indoor object may be an arrangement of a chair, a table, and a sofa.

A geometrical model (or 3D map or also called 3D reconstruction) of the real environment can be created using triangulation of 2D observations shared in a plurality of images captured by one or more cameras. Triangulation is a common method used in 3D reconstruction procedure, based on camera images, also called Structure from Motion (SfM), see reference [2].

A pose of a camera describes a spatial relationship or a rigid transformation between the camera at a particular position and a reference coordinate system. The reference coordinate system may be associated with a real object or with the camera at another position. The spatial relationship or the rigid body transformation describes at least one translation, or at least one rotation, or their combination in 3D space or at least one distance.

3D features represent or describe physical 3D features of the respective real object or at least part of the respective real object. The 3D features are, for example, but not limited to, points, edges, lines, segments, corners and/or any other geometrical shapes.

To describe a geometry of objects, positions of points and other geometric elements and other properties thereof like for example directions are uniquely determined in a coordinate system. A particular element, e.g. a position, is defined by an ordered tuple of numbers, the coordinates.

We in the following refer to a Cartesian coordinate system, bearing in mind that representations of geometrical figures in other coordinate systems (like e.g. polar coordinates or homogeneous coordinates) can be transformed into the Cartesian coordinate system and vice versa by coordinate transformations which describe the relation between two coordinate systems and provide formulas to express particular coordinates in one coordinate system by corresponding coordinates in the other coordinate system.

In the Cartesian coordinate system, each element of the coordinate tuple corresponds to the signed distance of the point to the corresponding hyperplane. The distance between two coordinate tuples itself can be defined as the Euclidean distance describing the length of the line segment connecting the two coordinate tuples. The distance itself thereby is also given as a 1D-coordinate.

It should be defined what a unit along a coordinate axis means. This unit of measurement is a quantity, used as a factor to express occurring quantities of that property, for example length. We characterize measurements (e.g. spatial coordinates defining positions of the measurements, and respectively coordinates defining spatial distances and length between the spatial coordinates) to be specified in absolute spatial units, also referred to as at absolute spatial scale, when the relation between a unit of the coordinate system where the measurements are defined in to a real-world spatial reference unit is known. The real-world spatial reference unit can for example be a meter (metric system) or any other unit for which a fix and known conversion to meters exists.

Measurements can be at absolute scale by either setting the spatial base unit of the coordinate system where the measurements are defined in directly to a real-world spatial reference unit or by specifying the spatial scaling of the coordinate system in relation to a real-world spatial reference unit.

An example for measurements which are not in absolute spatial units, but in an arbitrarily scaled coordinate system, is for example given by a reconstruction of 3D points by triangulation of corresponding point features from two images captured at different camera poses in space, where the length of the baseline between these two camera poses is unknown. Even though the coordinate axes have the same unit, the unit itself is not determined. That means although the ratio between two distances within the coordinate system is correct, the absolute scaling of the whole coordinate system in relation to the real world is unknown. The coordinate system and thereby the reconstruction itself then is said to be up to scale. Absolute scale does not refer to the absolute translational offset of an object, which depends on the origin of the coordinate system, but refers to the absolute size.

Facial features and fiducials may comprise positions (of corners, centers or bounding areas), size, shape, outlines, regions, scale, ratios and distances between and the appearance of left and right eyes (pupil, iris, cornea, sclera, inner canthus, outer canthus, center, upper and lower eyelids, eyelashes, . . . ), nasal bridge, nose (Tip, dorsum, alae, nostril, columella, . . . )(size, shape), philtrum, lips, left and right ears, left and right eye brows, teeth, left and right cheek, jaw, neck, laryngeal prominence, the structure and consistence of the skin (like pores), facial and head hair, etc.

Visual odometry refers to methods that determine the position and orientation of a camera by analyzing the associated camera images. When provided with depth information at absolute scale associated to at least one pixel in one camera image (e.g. the distance of the imaged surface for one pixel in millimeters), then visual odometry can determine camera poses (i.e. position and orientation) at absolute spatial scale. The terms visual odometry and SLAM are often used interchangeably.

REFERENCES

1. Davison, Andrew J., et al. "MonoSLAM: Real-time single camera SLAM." Pattern Analysis and Machine Intelligence, IEEE Transactions on 29.6 (2007): 1052-1067.
2. Hartley, Richard, and Andrew Zisserman. Multiple view geometry in computer vision. Vol. 2. Cambridge, 2000.
3. Azuma, Ronald, et al. "Recent advances in augmented reality." Computer Graphics and Applications, IEEE 21.6 (2001): 34-47.
4. Strasdat, Hauke, J. M. M. Montiel, and Andrew J. Davison. "Scale drift-aware large scale monocular SLAM." Proceedings of Robotics: Science and Systems (RSS). Vol. 2. No. 3. 2010.
5. Lemaire, Thomas, et al. "Vision-based slam: Stereo and monocular approaches." International Journal of Computer Vision 74.3 (2007): 343-364.
6. Lieberknecht, Sebastian, et al. "RGB-D camera-based parallel tracking and meshing." Mixed and Augmented Reality (ISMAR), 2011 10th IEEE International Symposium on. IEEE, 2011.
7. Klein, Georg, and David Murray. "Parallel tracking and mapping for small AR workspaces." Mixed and Augmented Reality, 2007. ISMAR 2007. 6th IEEE and ACM International Symposium on. IEEE, 2007.
8. Castle, Robert, Georg Klein, and David W. Murray. "Video-rate localization in multiple maps for wearable augmented reality." Wearable Computers, 2008. ISWC 2008. 12th IEEE International Symposium on. IEEE, 2008.
9. Mitzi, Gabriel, et al. "Fusion of IMU and vision for absolute scale estimation in monocular SLAM." Journal of intelligent & robotic systems 61.1-4 (2011): 287-299.
10. Umeyama, Shinji. "Least-squares estimation of transformation parameters between two point patterns." Pattern Analysis and Machine Intelligence, IEEE Transactions on 13.4 (1991): 376-380.
11. Esquivel, Sandro, Felix Woelk, and Reinhard Koch. "Calibration of a multi-camera rig from non-overlapping views." *Pattern Recognition*. Springer Berlin Heidelberg, 2007. 82-91.
12. Han, Hu, et al. "Demographic Estimation from Face Images: Human vs. Machine Performance."
13. Dodgson, Neil A. "Variation and extrema of human interpupillary distance."*Proceedings of SPIE*. Vol. 5291. 2004.
14. Clipp, Brian, et al. "Robust 6dof motion estimation for non-overlapping, multi-camera systems." *Applications of Computer Vision*, 2008. WACV 2008. IEEE Workshop on. IEEE, 2008
15. Ren, Shaoqing, et al. "Face Alignment at 3000 FPS via Regressing Local Binary Features."
16. Martins, Pedro, and Jorge Batista. "Accurate single view model-based head pose estimation." *Automatic Face & Gesture Recognition,* 2008. FG'08. 8*th IEEE International Conference on*. IEEE, 2008.
17. Asthana, Akshay, et al. "Incremental Face Alignment in the Wild." *Computer Vision and Pattern Recognition (CVPR),* 2014 *IEEE Conference on*. IEEE, 2014.
18. Wang, Peng, et al. "Automatic eye detection and its validation." *Computer Vision and Pattern Recognition-Workshops,* 2005. CVPR Workshops. IEEE Computer Society Conference on. IEEE, 2005.
19. Turk, Matthew A., and Alex P. Pentland. "Face recognition using eigenfaces."*Computer Vision and Pattern Recognition,* 1991. Proceedings CVPR'91., *IEEE Computer Society Conference on*. IEEE, 1991.
20. Daniel Kurz, Selim Behimane "Method of providing a descriptor for at least one feature of an image and method of matching features" US 20120219188 A1.

The invention claimed is:

1. A method of determining spatial coordinates of a 3D reconstruction of at least part of a first real object comprising:
    obtaining, from a first camera system, a first image comprising at least part of a first real object;
    obtaining, from a second camera system, a second image comprising at least part of a second real object associated with known geometric properties, wherein the first camera system and the second camera system have a known spatial relationship;
    determining a scale of at least part of the second real object based on the second image and the known geometric properties of the at least part of the second real object; and
    determining, based on the known spatial relationship and the scale of the at least part of the second real object, one or more coordinates of a geometrical model of the first real object at absolute scale.

2. The method of claim 1, wherein the second real object comprises at least part of a human face.

3. The method of claim 2, wherein the scale of at least part of the human face is determined based on a generic face model.

4. The method of claim 2, wherein the human face belongs to a particular user, and wherein the scale of the at least part of the human face is determined based on a user-specific face model.

5. The method of claim 1, wherein the first camera system and the second camera system are comprised in an electronic device.

6. The method of claim 1, wherein a frustum of the first camera system and a frustum of the second camera system do not overlap.

7. The method of claim 1, further comprising:
    presenting a virtual object at a scale consistent with the first real object according to the one or more coordinates of a geometrical model of the first real object at absolute scale.

8. A non-transitory computer readable medium comprising computer readable code for determining spatial coordinates of a 3D reconstruction of at least part of a first real object, the computer readable code executable by a processor to:
    obtain, from a first camera system, a first image comprising at least part of a first real object;
    obtain, from a second camera system, a second image comprising at least part of a second real object associated with known geometric properties, wherein the first camera system and the second camera system have a known spatial relationship;
    determine a scale of at least part of the second real object based on the second image and the known geometric properties of the at least part of the second real object; and
    determine, based on the known spatial relationship and the scale of the at least part of the second real object, one or more coordinates of a geometrical model of the first real object at absolute scale.

9. The non-transitory computer readable medium of claim 8, wherein the second real object comprises at least part of a human face.

10. The non-transitory computer readable medium of claim 9, wherein the scale of at least part of the human face is determined based on a generic face model.

11. The non-transitory computer readable medium of claim 9, wherein the human face belongs to a particular user, and wherein the scale of the at least part of the human face is determined based on a user-specific face model.

12. The non-transitory computer readable medium of claim 8, wherein the first camera system and the second camera system are comprised in an electronic device.

13. The non-transitory computer readable medium of claim 8, wherein a frustum of the first camera system and a frustum of the second camera system do not overlap.

14. The non-transitory computer readable medium of claim 8, further comprising computer readable code to:
    present a virtual object at a scale consistent with the first real object according to the one or more coordinates of a geometrical model of the first real object at absolute scale.

15. A system for determining spatial coordinates of a 3D reconstruction of at least part of a first real object, comprising:
    a first camera system;
    a second camera system having a known spatial relationship with the first camera system;
    one or more processors; and
    a computer readable medium comprising computer readable code executable by the one or more processors to:
        obtain, from the first camera system, a first image comprising at least part of a first real object;
        obtain, from the second camera system, a second image comprising at least part of a second real object associated with known geometric properties;
        determine a scale of at least part of the second real object based on the second image and the known geometric properties of the at least part of the second real object; and
        determine, based on the known spatial relationship and the scale of the at least part of the second real object, one or more coordinates of a geometrical model of the first real object at absolute scale.

16. The system of claim 15, wherein the second real object comprises at least part of a human face.

17. The system of claim 16, wherein the scale of at least part of the human face is determined based on a generic face model.

18. The system of claim 16, wherein the human face belongs to a particular user, and wherein the scale of the at least part of the human face is determined based on a user-specific face model.

19. The system of claim 15, wherein a frustum of the first camera system and a frustum of the second camera system do not overlap.

20. The system of claim 15, further comprising computer readable code to:
    present a virtual object at a scale consistent with the first real object according to the one or more coordinates of a geometrical model of the first real object at absolute scale.

* * * * *